(12) United States Patent
Kurihashi

(10) Patent No.: US 12,172,656 B2
(45) Date of Patent: Dec. 24, 2024

(54) INFORMATION PRESENTATION DEVICE, INFORMATION PRESENTING METHOD AND NON-TRANSITORY RECORDING MEDIUM

(71) Applicant: TOYOTA JIDOSHA KABUSHIKI KAISHA, Toyota (JP)

(72) Inventor: Sui Kurihashi, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 231 days.

(21) Appl. No.: 17/945,327

(22) Filed: Sep. 15, 2022

(65) Prior Publication Data
US 2023/0125901 A1 Apr. 27, 2023

(30) Foreign Application Priority Data
Oct. 27, 2021 (JP) ................. 2021-175872

(51) Int. Cl.
*B60W 40/12* (2012.01)
*B60W 30/16* (2020.01)
*B60W 50/14* (2020.01)

(52) U.S. Cl.
CPC ............ *B60W 40/12* (2013.01); *B60W 30/16* (2013.01); *B60W 50/14* (2013.01)

(58) Field of Classification Search
CPC ...... B60W 40/12; B60W 30/16; B60W 50/14; B60W 2050/146; B60W 30/165; B60W 2556/65; B60W 50/0097; B60W 40/1005; B60W 2530/16; B60W 2530/209; B60W 2554/4046; B60W 30/14; B60W 2530/13; B60W 60/0023; B60W 60/0027; B60K 2360/169; B60K 35/00; B60K 35/28; G08G 1/22; G08G 1/161
See application file for complete search history.

(56) References Cited

U.S. PATENT DOCUMENTS

| 2009/0312923 A1* | 12/2009 | Mills ................ B60W 30/16 701/57 |
| 2012/0123618 A1* | 5/2012 | Kinser ................ B60L 58/12 701/22 |
| 2016/0097652 A1* | 4/2016 | Liu ................ G01C 21/3469 701/423 |

(Continued)

FOREIGN PATENT DOCUMENTS

| JP | 2008275500 A | * 11/2008 | ............ G01C 21/00 |
| JP | 2013-222235 A | 10/2013 | |

(Continued)

*Primary Examiner* — Hunter B Lonsberry
*Assistant Examiner* — Henry R Hinton
(74) *Attorney, Agent, or Firm* — Oliff PLC

(57) ABSTRACT

An information presentation device includes a processor configured to (i) select a preceding vehicle candidate that is a candidate to be followed by an own vehicle based on information about a surrounding vehicle around the own vehicle, (ii) estimate an extended cruising range of the own vehicle obtained by a follow-up travel of the own vehicle traveling behind the preceding vehicle candidate, and (iii) output, via an output device provided in the own vehicle, the extended cruising range as extension information of a cruising range of the own vehicle when the own vehicle follows the preceding vehicle candidate.

8 Claims, 13 Drawing Sheets

(56) References Cited

U.S. PATENT DOCUMENTS

| | | |
|---|---|---|
| 2018/0198955 A1 | 7/2018 | Watanabe |
| 2020/0207371 A1* | 7/2020 | Dougherty ............... G08G 1/22 |
| 2020/0294323 A1* | 9/2020 | Zeng ...................... G07C 5/085 |
| 2022/0105933 A1* | 4/2022 | Shieh ................... G06V 20/584 |

FOREIGN PATENT DOCUMENTS

| | | | | |
|---|---|---|---|---|
| JP | 2014092795 A | * | 5/2014 | |
| JP | 2017-021546 A | | 1/2017 | |
| JP | 2017-211955 A | | 11/2017 | |
| JP | 2018165684 A | * | 10/2018 | |
| SE | 1650044 A1 | * | 7/2017 | ............ B60W 30/16 |

* cited by examiner

FIG. 8

FIRST CONFIDENCE DEGREE OF REDUCTION
DEGREE OF AIR RESISTANCE (A~E)

RELIABILITY OF PRECEDING VEHICLE INFORMATION

|   | 2 | 1 | 0 |
|---|---|---|---|
| 2 | A | B− | C− |
| 1 | B+ | C | D− |
| 0 | C+ | D+ | E |

DRIVING SUPPORT LEVEL OF OWN VEHICLE

FIG. 9

SECOND CONFIDENCE DEGREE OF CONTINUABLE
DISTANCE OF FOLLOW-UP TRAVEL (A~E)

|  | RELIABILITY OF PRECEDING VEHICLE INFORMATION | | |
|---|---|---|---|
| RELIABILITY OF RUNNING ENVIRONMENT INFORMATION | 2 | 1 | 0 |
| 2 | A | B− | C− |
| 1 | B+ | C | D− |
| 0 | C+ | D+ | E |

… (continued)

INFORMATION PRESENTATION DEVICE, INFORMATION PRESENTING METHOD AND NON-TRANSITORY RECORDING MEDIUM

FIELD

The present disclosure relates to an information presentation device, an information presenting method, and a non-transitory recording medium.

BACKGROUND

In order to reduce the amount of fuel or electric power required for running a vehicle, it is effective to reduce the air resistance during running. Conventionally, as a technique for reducing the air resistance at the time of running, it is known to perform a follow-up running in which the vehicle is made to follow a preceding vehicle. In the follow-up travel, the air resistance acting on the vehicle traveling behind the preceding vehicle is reduced by the wind shielding effect of the preceding vehicle.

As an example of such a follow-up travel, it is known to perform platooning in which a plurality of vehicles travel in a platoon. In the traveling support device described in Patent Document 1, the number of vehicles and the positions of a group of vehicles traveling in a platoon in the peripheral area of the own vehicle including the range that cannot be visually recognized from the own vehicle are presented to the driver of the own vehicle. As a result, the driver of the own vehicle can determine a group of vehicles to which the own vehicle joins, considering the number of vehicles constituting the group.

CITATIONS LIST

Patent Literature

[PTL 1] Japanese Unexamined Patent Publication No. 2017-211955

SUMMARY

Technical Problem

However, even if the number of vehicles constituting the group is presented to the occupant of the vehicle, it is difficult for the occupant of the vehicle to appropriately grasp the effect obtained by the follow-up travel. Therefore, it is difficult for the occupant of the own vehicle to be motivated to carry out the follow-up travel.

In view of the above problems, an object of the present disclosure is to urge the occupant of the vehicle to perform the follow-up travel by presenting the effect of the follow-up travel.

Solution to Problem

The summary of the present disclosure is as follows.

(1) An information presentation device comprising a processor configured to: select a preceding vehicle candidate that is a candidate to be followed by an own vehicle based on information about a surrounding vehicle around the own vehicle; estimate an extended cruising range of the own vehicle obtained by a follow-up travel of the own vehicle following behind the preceding vehicle candidate; and output, via an output device provided in the own vehicle, the extended cruising range as extension information of a cruising range of the own vehicle when the own vehicle follows the preceding vehicle candidate.

(2) The information presentation device described in above (1), wherein the processor is further configured to (i) calculate an estimated accuracy of the extended cruising range, and (ii) change an output mode of the extension information based on the estimated accuracy.

(3) The information presentation device described in above (2), wherein the processor is configured to calculate the estimated accuracy based on a reliability of information about the preceding vehicle candidate.

(4) The information presentation device described in above (2) or (3), wherein the processor is configured to calculate the estimated accuracy based on a driving support level of the own vehicle.

(5) The information presentation device described in any one of above (2) to (4), wherein the processor is configured to calculate the estimated accuracy based on a reliability of running environment information about the driving route of the own vehicle.

(6) The information presentation device described in any one of above (2) to (5), wherein the processor is configured to calculate the estimated accuracy based on a first confidence degree of a degree of reduction of an air resistance obtained by the follow-up travel of the own vehicle following behind the preceding vehicle candidate and a second confidence degree of a continuable distance of the own vehicle performing the follow-up travel of following behind the preceding vehicle candidate.

(7) The information presentation device described in any one of above (2) to (6), wherein the processor is configured to (i) output the extended cruising range as the extension information when the estimated accuracy is equal to or greater than a threshold value, and (ii) not output the extension information when the estimated accuracy is less than the threshold value.

(8) The information presentation device described in any one of above (2) to (6), wherein the processor is configured to (i) output the extended cruising range as the extension information when the estimated accuracy is equal to or greater than a threshold value, and (ii) output a distance shorter than the extended cruising range as the extension information when the estimated accuracy is less than the threshold value.

(9) The information presentation device described in any one of above (2) to (6), wherein the processor is configured to (i) output the extended cruising range as the extension information when the estimated accuracy is equal to or greater than a first threshold, (ii) output a distance shorter than the extended cruising range as the extension information when the estimated accuracy is less than the first threshold and equal to or greater than a second threshold lower than the first threshold, and (iii) not output the extension information when the estimated accuracy is less than the second threshold.

(10) An information presenting method executed by a hardware processor, the method comprising: selecting a preceding vehicle candidate that is a candidate to be followed by an own vehicle based on information about a surrounding vehicle around the own vehicle; estimating an extended cruising range of the own vehicle obtained by a follow-up travel of the own vehicle following behind the preceding vehicle candidate; and outputting, via an output device provided in the own vehicle, the extended cruising range as extension information of a cruising range of the own vehicle when the own vehicle follows the preceding vehicle candidate.

(11) A non-transitory recording medium having recorded thereon a computer program for presenting information, the computer program, when executed by a hardware processor of a computer, causing the hardware processor to: select a preceding vehicle candidate that is a candidate to be followed by an own vehicle based on information about a surrounding vehicle around the own vehicle; estimate an extended cruising range of the own vehicle obtained by a follow-up travel of the own vehicle following behind the preceding vehicle candidate; and output, via an output device provided in the own vehicle, the extended cruising range as extension information of a cruising range of the own vehicle when the own vehicle follows the preceding vehicle candidate.

According to the present disclosure, it is possible to urge the occupant of the own vehicle to perform the follow-up travel, and to facilitate the selection of the preceding vehicle to be followed.

BRIEF DESCRIPTION OF DRAWINGS

FIG. 8 is a diagram illustrating an example of a table for determining the first confidence degree of the degree of reduction of the air resistance due to the follow-up travel of an own vehicle following behind the preceding vehicle candidate.

FIG. 9 is a diagram illustrating an example of a table for determining a second degree of confidence in a continuable distance of the own vehicle performing follow-up travel of following behind a preceding vehicle candidate.

DESCRIPTION OF EMBODIMENTS

Figure 1:
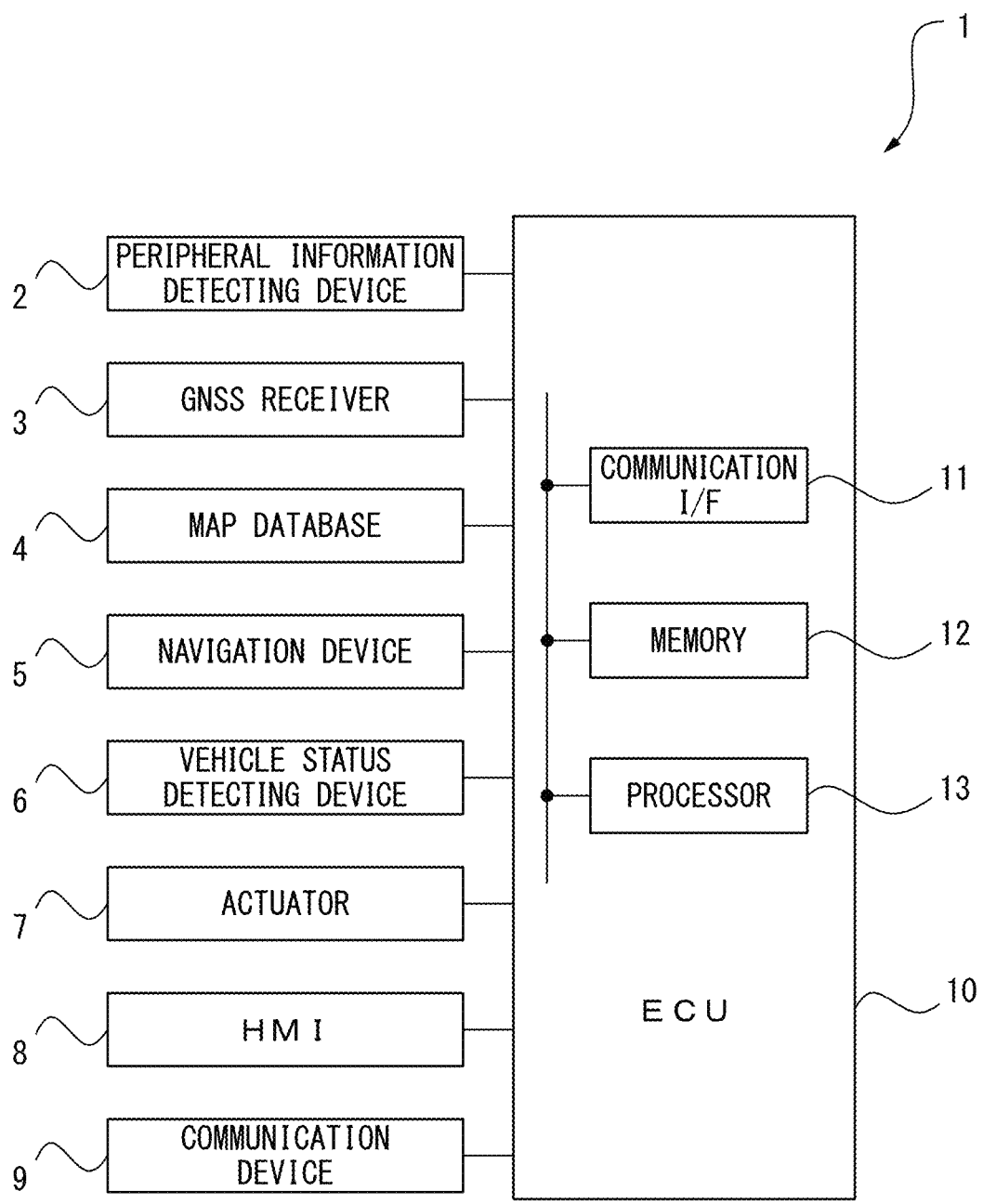
FIG. 1 is a schematic block diagram of a vehicle control system including an information presentation device according to a first embodiment of the present disclosure.

Hereinafter, embodiments of the present disclosure will be described in detail with reference to the drawings. In the following description, like components are denoted by the same reference numerals.

First Embodiment

Hereinafter, a first embodiment of the present disclosure will be described with reference to FIGS. 1 to 5.

FIG. 1 is a schematic block diagram of a vehicle control system 1 including an information presentation device according to a first embodiment of the present disclosure. Vehicle control system 1 is mounted on the vehicle, and executes various controls of the vehicle.

As shown in FIG. 1, the vehicle control system 1 includes a peripheral information detecting device 2, a GNSS receiver 3, a map database 4, a navigation device 5, a vehicle status detecting device 6, an actuator 7, a human machine interface (HMI: Human Machine Interface) 8, a communication device 9 and an electronic control unit (Electronic Control Unit (ECU)) 10. Device 2, GNSS receiver 3, the map database 4, the navigation device 5, the vehicle status detecting device 6, the actuator 7, HMI 8, and the communication device 9 are electrically connected to ECU 10 via an in-vehicle network conforming to the CAN (Controller Area Network) standard or the like.

Peripheral information detecting device 2 acquires data around the vehicle (own vehicle) (images, point group data, etc.), and detects the peripheral information of the vehicle (e.g., surrounding vehicles, lanes, etc.). For example, device 2 includes a millimeter wave radar, a camera (e.g., a stereo camera), a LIDAR (Laser Imaging Detection And Ranging), or an ultrasonic sensor (sonar), or any combinations thereof. The peripheral information detected by the output of the peripheral information detecting device 2, that is, the peripheral information of the vehicle detected by the peripheral information detecting device 2 is transmitted to ECU 10.

GNSS receiver 3, based on the positioning information obtained from a plurality of (e.g., three or more) positioning satellites, detects the present position of the vehicle (e.g., latitude and longitude of the vehicle). Specifically, GNSS receiver 3 captures a plurality of positioning satellites and receives radio waves transmitted from the positioning satellites. Then, GNSS receiver 3 calculates the distance to the positioning satellite based on the difference between the transmission time and the reception time of the radio wave, and detects the present position of the vehicle based on the distance to the positioning satellite and the position of the positioning satellite (orbital information). The power of GNSS receiver 3, i.e., the present position of the vehicle detected by GNSS receiver 3, is transmitted to ECU 10.

Note that GNSS (Global Navigation Satellite System: Global Positioning Satellite System) is a generic term for satellite positioning systems such as U.S. GPS, Russian GLONASS, European Galileo, Japan QZSS, Chinese BeiDou, and Indian IRNSS. That is, the GPS receiver is an exemplary GNSS receiver 3.

The map database 4 stores map information. The ECU 10 acquires map information from the map database 4. The map database may be provided outside the vehicle, for example, servers, and ECU 10 may acquire map data from outside the vehicle.

The navigation device 5 sets a driving route of the vehicle to the destination based on the present position of the vehicle detected by GNSS receiver 3, map data in the map database 4, inputs by a vehicle occupant, for example, a driver, and the like. The driving route set by device 5 is transmitted to ECU 10.

Vehicle status detecting device 6 detects the status quantity of the vehicle. The vehicle status detecting device 6 includes, for example, a vehicle speed sensor for detecting the speed of the vehicle, a yaw rate sensor for detecting the yaw rate of the vehicle, and the like. The output of the vehicle status detecting device 6, i.e., the status quantity of the vehicle detected by the vehicle status detecting device 6, is transmitted to ECU 10.

The actuator 7 operates the vehicle. For example, actuator 7 includes a drive device (e.g., at least one of an internal combustion engine and an electric motor) for acceleration of a vehicle, a brake actuator for braking (deceleration) of the vehicle, and a steering motor for steering of the vehicle.

ECU 10 controls the actuator 7 to control the behavior of the vehicle.

In the present embodiment, the vehicle control system 1 functions as an advanced driving support system (ADAS: Advanced Driving Assistant System), to operate a predetermined driving support function by controlling the actuator 7. The predetermined driving assistance function includes, for example, an adaptive cruise control (ACC: Adaptive Cruise Control) that automatically controls the speed of the vehicle according to the presence or absence of the preceding vehicle, lane keeping assist (LKA: Lane Keeping Assist) or lane tracing assist (LTA: Lane Tracing Assist) that automatically controls the steering of the vehicle so that the vehicle is maintained in the lane, and the like.

HMI 8 exchanges data between the vehicle and the occupants of the vehicle, e.g., drivers.

HMI 8 includes an output unit (e.g., a display, a speaker, a vibration unit, etc.) for outputting information to the occupant of the vehicle, and an input unit (e.g., a touch panel, an operation button, an operation switch, a microphone, etc.) for inputting information by the occupant of the vehicle. The output of ECU 10 is notified to the occupant of the vehicle via HMI 8, and the input from the occupant of the vehicle is transmitted to ECU 10 via HMI 8. A HMI 8 is an instance of an input device, an output device, or an input/output device. Note that a portable terminal (smartphone, tablet terminal, or the like) of a vehicle occupant may be connected to ECU 10 by wire or wirelessly so as to be able to communicate with the ECU 10, and may function as a HMI 8. The HMI 8 may also be integral with the navigation device 5.

The communication device 9 is capable of communicating with the outside of the vehicle and allows communication between the vehicle and the outside of the vehicle. For example, the communication device 9 includes an inter-vehicle communicator that allows inter-vehicle communication between the vehicle and the surrounding vehicles using a predetermined frequency band.

The ECU 10 performs various control of the vehicle. As shown in FIG. 1, ECU 10 includes a communication interface 11, a memory 12, and a processor 13. The communication interface 11 and memory 12 are connected to the processor 13 via signal lines. Although one ECU 10 is provided in the present embodiment, a plurality of ECUs may be provided for each function.

The communication interface 11 has interface circuits for connecting ECU 10 to in-vehicle networks. The ECU 10 is connected to other in-vehicle devices via the communication interface 11. The communication interface 11 is an exemplary communication unit of ECU 10.

The memory 12 includes, for example, a volatile semiconductor memory and a nonvolatile semiconductor memory. The memory 12 stores computer programs, data, and the like, which are used when various processes are executed by the processor 13.

The processor 13 includes one or a plurality of CPUs (Central Processing Unit) and peripheral circuits thereof. The processor 13 may further include an arithmetic circuit such as a logical arithmetic unit or a numerical arithmetic unit.

Incidentally, in order to reduce the amount of fuel or power consumption required for the running of the vehicle, it is effective to reduce the air resistance during running. Conventionally, as a technique for reducing the air resistance at the time of running, it is known to perform a follow-up running in which the vehicle is made to follow a preceding vehicle. In the follow-up travel, the air resistance acting on the vehicle traveling behind the preceding vehicle is reduced by the wind shielding effect of the preceding vehicle.

However, the vehicle occupant (e.g., a driver) does not necessarily properly grasp the effect obtained by the follow-up travel. Therefore, even if there is an advantage obtained from the follow-up travel, motivation for the occupant of the own vehicle to perform the follow-up travel is unlikely to occur.

Therefore, in the present embodiment, the information presentation device presents to the occupant of the own vehicle the effect obtained by the follow-up travel through the output device provided in the own vehicle. In the present embodiment, ECU 10 functions as an information presentation device, and HMI 8 functions as an output device.

Figure 2:
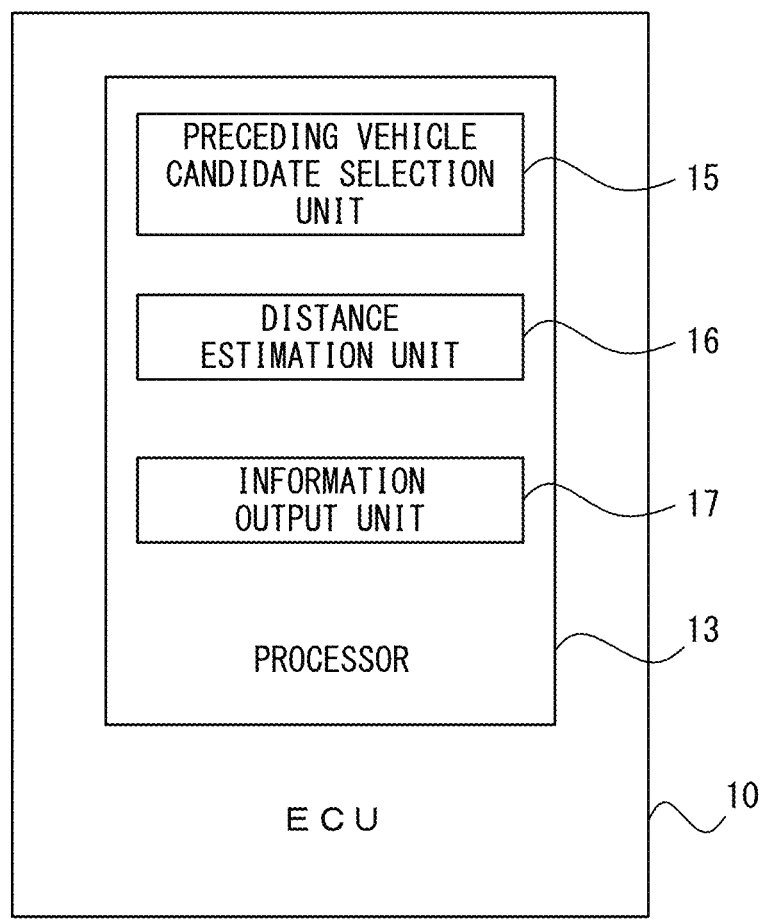
FIG. 2 is a functional block diagram of the processor of the ECU according to the first embodiment.

FIG. 2 is a functional diagram of the processor 13 of ECU 10 according to the first embodiment.

In the present embodiment, the processor 13 includes a preceding vehicle candidate selection unit 15, a distance estimation unit 16, and an information output unit 17. The preceding vehicle candidate selection unit 15, the distance estimation unit 16, and the information output unit 17 are functional modules realized by ECU 10 processor 13 executing computer programs stored in the memory 12 of ECU 10. Each of these functional modules may be realized by a dedicated arithmetic circuit provided in the processor 13.

The preceding vehicle candidate selection unit 15 selects the preceding vehicle candidate that is a candidate to be followed by the own vehicle based on information about the surrounding vehicle around the own vehicle. In the present embodiment, the preceding vehicle candidate selection unit 15 acquires information about the surrounding vehicle around the own vehicle through inter-vehicle communication between the own vehicle and the surrounding vehicle.

Figure 3:
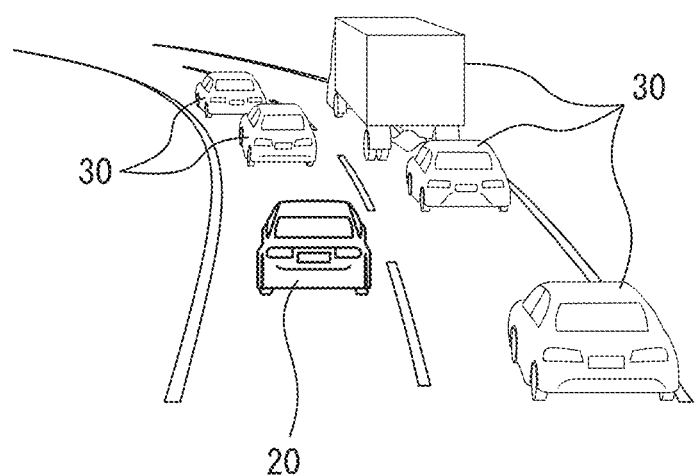
FIG. 3 is a diagram showing an example of a scene in which a plurality of vehicles are traveling on an automobile-only road.

FIG. 3 is a diagram showing an example of a scene in which a plurality of vehicles are traveling on an automobile-only road. In the example of FIG. 3, five surrounding vehicles 30 are traveling around the vehicle 20. Further, in the range that is not visible from the vehicle 20, there may be a surrounding vehicle serving as a candidate of the tracking target. In such a situation, the preceding vehicle candidate selection unit 15 acquires information about each of the plurality of surrounding vehicles 30 around the own vehicle 20 via the vehicle-to-vehicle communication, and selects the preceding vehicle candidate from among the plurality of surrounding vehicles 30. For example, the preceding vehicle candidate selection unit 15, for each of the plurality of surrounding vehicles 30, calculates the suitability as a tracking target based on the information about the surrounding vehicle 30, selects the surrounding vehicle 30 having the highest suitability as the preceding vehicle candidate.

Various information is presented to the occupant of the vehicle through HMI 8. For example, one useful information for the occupant of the vehicle may include the cruising range of the vehicle, i.e., the distance that the vehicle can continue to travel without requiring refueling and/or battery charging. Normally, when the follow-up travel is performed, the cruising range of the own vehicle is extended due to the effect of reducing the air resistance. For this reason, the distance estimation unit 16 estimates the extended cruising range of the own vehicle obtained by the follow-up travel to the preceding vehicle candidate selected by the preceding vehicle candidate selection unit 15. Note that the extended cruising range of the own vehicle is the amount of increase in the cruising range, which corresponds to the value obtained by subtracting the cruising range when the own vehicle runs alone from the cruising range when the own vehicle follows the preceding vehicle candidate (extended range=cruising range by follow-up travel−cruising range by independent travel).

The information output unit 17 outputs the extension information of the cruising range when the own vehicle follows the preceding vehicle candidate through HMI 8. The extension information of the cruising range is created based on the extended cruising range estimated by the distance estimation unit 16, and in the present embodiment, the information output unit 17 outputs the extended cruising range estimated by the distance estimation unit 16 as the extension information of the cruising range. Therefore, according to the information presentation device of the present embodiment, the extended cruising range of the own vehicle is presented to the occupant of the own vehicle as the effect obtained by the follow-up travel. Thus, it is possible to clearly indicate the specific effect obtained by the follow-up travel to the occupant of the vehicle, and thus to urge the occupant of the vehicle to perform the follow-up travel.

Figure 4:
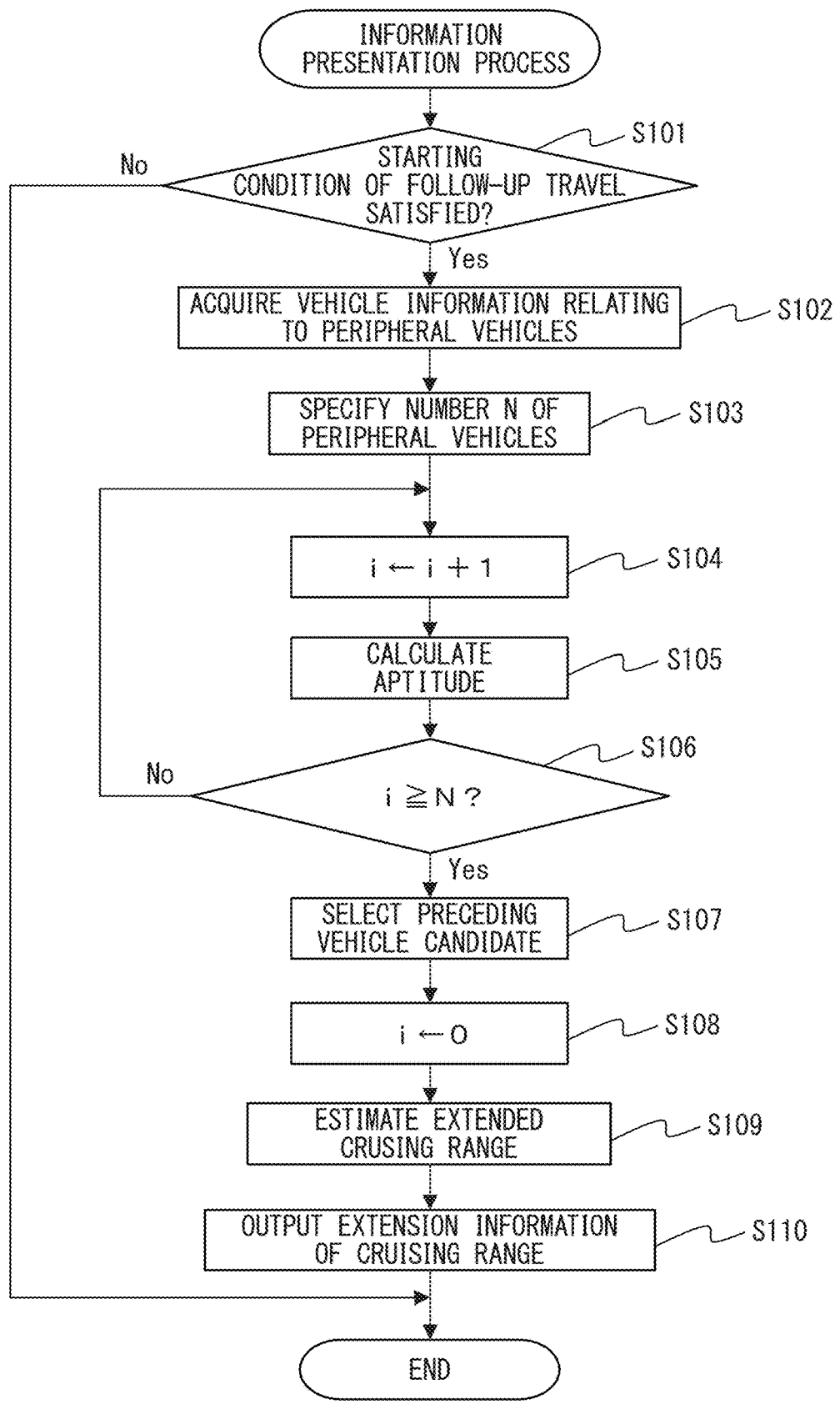
FIG. 4 is a flowchart showing a control routine of the information presentation process according to the first embodiment.

Hereinafter, the control flow of the above-described processing will be described in detail with reference to FIG. 4. FIG. 4 is a flowchart showing a control routine of the information presentation process according to the first embodiment. The control routine is repeatedly executed at predetermined intervals by the processor 13 of the ECU 10.

First, in step S101, the preceding vehicle candidate selection unit 15 determines whether or not a condition for starting the follow-up travel is satisfied. The starting condition of the follow-up travel is predetermined, for example, when the occupant of the own vehicle requests the operation of the ACC via HMI 8. Note that the start condition of the follow-up travel may be that the vehicle is traveling on an automobile exclusive road at a speed equal to or higher than a predetermined value or the like. If it is determined in step S101 that the condition for starting the follow-up travel is not satisfied, the control routine ends.

On the other hand, if it is determined in step S101 that the condition for starting the follow-up travel is satisfied, the control routine proceeds to step S102. In step S102, the preceding vehicle candidate selection unit 15 communicates with the surrounding vehicles located within the communication range of the vehicle-to-vehicle communication and acquires information about the surrounding vehicles via the vehicle-to-vehicle communication. In the present embodiment, as information about the surrounding vehicle, the position of the surrounding vehicle, the speed of the surrounding vehicle, the operating state of the ACC in the surrounding vehicle (on or off), the vehicle width and the vehicle length of the surrounding vehicle, the usage type of the surrounding vehicle and the like are transmitted from the surrounding vehicle to the own vehicle.

Next, in step S103, the preceding vehicle candidate selection unit 15 specifies the number N of the surrounding vehicles in which the information is acquired by the own vehicle, and assigns the vehicle numbers (1 to N) to each of the N surrounding vehicles.

Next, in step S104, the preceding vehicle candidate selection unit 15 updates the vehicle number i by adding 1 to the vehicle number i. Note that the initial value of the vehicle number i when the ignition switch of the own vehicle is turned on is zero.

Next, in step S105, the preceding vehicle candidate selection unit 15 calculates the suitability as the tracking target for the i-th surrounding vehicle based on the information about the surrounding vehicle. For example, the preceding vehicle candidate selection unit 15 calculates at least one predetermined evaluation parameter based on information about the surrounding vehicle, and calculates the suitability based on the evaluation parameter.

As described above, by performing the follow-up travel to the preceding vehicle, it is possible to reduce the air resistance acting on the own vehicle. At this time, the larger the degree of reduction in air resistance, the higher the improvement effect of fuel consumption or power consumption by the follow-up travel. Further, when the relative speed between the own vehicle and the surrounding vehicle is small, as compared with the case where the relative speed is large, it is easy to follow the surrounding vehicle. Furthermore, the higher the vehicle speed stability of the surrounding vehicle, it is possible to reduce the waste of fuel or electric power due to the acceleration or deceleration of the own vehicle during the follow-up travel. Therefore, in the present embodiment, as the evaluation parameter, the degree of reduction of the air resistance due to the follow-up travel to the surrounding vehicle, the relative speed between the own vehicle and the surrounding vehicle, and the vehicle speed stability of the surrounding vehicle are used.

The preceding vehicle candidate selection unit 15 calculates the degree of reduction of the air resistance due to the follow-up travel to the surrounding vehicle based on the information relating to the surrounding vehicle. For example, the preceding vehicle candidate selection unit 15 calculates the estimated value of the forward projected area of the surrounding vehicle based on the vehicle width and the vehicle length of the surrounding vehicle, and calculates the degree of reduction of the air resistance based on the estimated value and the speed of the surrounding vehicle. In this case, the greater the estimated value of the forward projected area, the greater the degree of reduction in air resistance.

Further, the preceding vehicle candidate selection unit 15 calculates the relative speed between the own vehicle and the surrounding vehicle based on the information relating to the surrounding vehicle. Specifically, the preceding vehicle candidate selection unit 15 calculates the relative speed between the own vehicle and the surrounding vehicle as the difference between the speed of the own vehicle detected by the vehicle speed sensor of the vehicle status detecting device 6 and the speed of the surrounding vehicle (relative speed=|speed of the own vehicle−speed of the surrounding vehicle|). As the speed of the own vehicle, the set vehicle speed of the ACC set by the occupant of the own vehicle (e.g., a driver) may be used.

Further, the preceding vehicle candidate selection unit 15 calculates the vehicle speed stability of the surrounding vehicle based on the information relating to the surrounding vehicle. For example, the preceding vehicle candidate selection unit 15 calculates the vehicle speed stability of the surrounding vehicle based on the operating state of the ACC in the surrounding vehicle.

In this case, when the operating state of the ACC is on, the vehicle speed stability of the surrounding vehicle is increased as compared with the case where the operating state of the ACC is off. The preceding vehicle candidate selection unit 15 may calculate the vehicle speed stability of the surrounding vehicle based on the history of the vehicle speed of the surrounding vehicle (for example, the change amount of the vehicle speed at a predetermined time) or the like.

The preceding vehicle candidate selection unit 15 calculates the suitability for the i-th surrounding vehicle based on these evaluation parameters using a map or a calculation formula. At this time, the greater the degree of reduction in air resistance, the higher the suitability, the smaller the relative speed between the vehicle and the surrounding vehicle, the higher the suitability, and the higher the vehicle speed stability of the surrounding vehicle, the higher the suitability.

Note that the preceding vehicle candidate selection unit 15 may correct the suitability based on the preference information of the occupant of the vehicle relating to the selection of the preceding vehicle. In this case, the preference information is registered in advance by the occupant of the vehicle, and the preference information is stored in the memory 12 of ECU 10 or the like. For example, the occupant of the own vehicle inputs, as preference information, whether or not to allow tracking (follow up) to a large vehicle such as a bus or truck, whether to allow lane change of the own vehicle for follow-up travel, and the like to HMI 8. In this case, if the tracking to the large-sized vehicle is not permitted, the suitability is corrected so that the suitability of the surrounding vehicle, which is the large-sized vehicle, is lowered (for example, the suitability is made zero). Further, when the lane change of the own vehicle for the follow-up travel is not allowed, the suitability is corrected so that the suitability of the surrounding vehicle traveling in a lane different from the own vehicle is low (for example, the suitability is set to zero).

Next, in step S106, the preceding vehicle candidate selection unit 15 determines whether or not the vehicle number i is equal to or greater than N. If it is determined that the vehicle number i is less than N, the control routine returns to step S104 and steps S104 and S105 are performed again to calculate the suitability for another surrounding vehicle.

On the other hand, if it is determined in step S106 that the vehicle number i is equal to or greater than N, the control routine proceeds to step S107. In step S107, the preceding vehicle candidate selection unit 15 selects the surrounding vehicle having the highest suitability among the N surrounding vehicles as the preceding vehicle candidate.

Note that the preceding vehicle candidate selection unit 15 may select the preceding vehicle candidate based on other determination criteria. For example, the preceding vehicle candidate selection unit 15 may select the surrounding vehicle closest to the own vehicle among the surrounding vehicles whose suitability is equal to or higher than a predetermined value as the preceding vehicle candidate. In addition, the preceding vehicle candidate selection unit 15 may select the surrounding vehicle having the highest suitability among the surrounding vehicles whose distance to the own vehicle is equal to or less than a predetermined value or the surrounding vehicles located in front of the own vehicle as the preceding vehicle candidate. Further, the preceding vehicle candidate selection unit 15 may select the surrounding vehicle closest to the own vehicle among the surrounding vehicles located in front of the own vehicle in the running lane of the own vehicle as the preceding vehicle candidate without calculating the suitability.

Next, in step S108, the preceding vehicle candidate selection unit 15 resets the vehicle number i to zero.

Then, in step S109, the distance estimation unit 16 estimates the extended cruising range of the own vehicle. For example, the distance estimation unit 16 estimates the extended cruising range based on the degree of reduction of the air resistance by the follow-up travel to the preceding vehicle candidate and the continuable distance of the follow-up travel to the preceding vehicle candidate. As a specific example, when the own vehicle is a vehicle (for example, an electric vehicle (BEV), a plug-in hybrid vehicle (PHEV), or the like) in which the vehicle is powered by electric power, the distance estimation unit 16 calculates the power consumption amount saved by the follow-up travel to the preceding vehicle candidate based on the degree of reduction of the air resistance due to the follow-up travel to the preceding vehicle candidate and the continuable distance of the follow-up travel to the preceding vehicle candidate, and calculates the extended cruising range of the own vehicle by multiplying the estimated electric mileage by the power consumption amount. On the other hand, when the own vehicle is a vehicle (for example, a gasoline vehicle, a diesel vehicle, or the like) in which the vehicle is powered by fuel, the distance estimation unit 16 calculates the fuel consumption amount saved by the follow-up travel to the preceding vehicle candidate based on the degree of reduction of the air resistance due to the follow-up travel to the preceding vehicle candidate and the continuable distance of the follow-up travel to the preceding vehicle candidate, and calculates the extended cruising range of the own vehicle by multiplying the estimated fuel mileage by the fuel consumption amount.

The degree of reduction in the air resistance due to the follow-up travel to the preceding vehicle candidate is calculated, for example, based on the estimated forward projected area of the preceding vehicle candidate and the speed of the preceding vehicle candidate, as described above. On the other hand, the continuable distance of the follow-up travel to the preceding vehicle candidate is calculated, for example, based on the traveling plan of the own vehicle. As a specific example, when the own vehicle is traveling on an automobile exclusive road, the continuable distance of the follow-up travel is set to the continuation traveling distance of the own vehicle on the automobile exclusive road, for example, the distance from the current position of the own vehicle to the exit of the automobile exclusive road that the own vehicle intends to use. The exit of an automobile exclusive road that the own vehicle intends to use is specified based on the driving route of the own vehicle, the running history of the own vehicle, and the like.

Note that based on the usage type information of the preceding vehicle candidate obtained via the vehicle-to-vehicle communication, the continuable distance of the follow-up travel may be corrected. In this case, the continuable distance of the follow-up travel is calculated by multiplying the continuable distance of the own vehicle by a predetermined coefficient determined based on the usage type information. For example, the predetermined coefficient is set to 1 when the preceding vehicle candidate is a passenger transportation business vehicle or a freight transportation business vehicle that is highly likely to travel long distances, and is set to a value less than 1 (e.g., 0.5) when the preceding vehicle candidate is a private vehicle.

Further, the continuable distance of the follow-up travel to the preceding vehicle candidate may be corrected based on the traveling environment information on the traveling route of the own vehicle. In this case, when running environment information that prevents the vehicle from following, for example, information such as traffic congestion, construction work, accident, bad weather (rain, snow, strong wind, heavy fog, etc.) is acquired, the continuable distance of the follow-up travel is shortened according to the occurrence point.

Further, as the estimated electric mileage or the estimated fuel mileage for calculating the extended cruising range, for example, the average electric mileage or the average fuel mileage at a predetermined distance to the present position is used. Note that the estimated electric mileage or the estimated fuel mileage may be corrected based on the running environment information on the running route of the own vehicle (e.g., the road gradient, the average vehicle speed, the traffic flow (e.g., the presence or absence of traffic jams), etc.).

Next, in step S110, the information output unit 17 outputs the extended cruising range as the extension information of the cruising range when the own vehicle follows the preceding vehicle candidates through HMI 8. For example, the information output unit 17 displays the image information including the extension information of the cruising range on HMI 8 in order to provide the visual information to the occupant of the own vehicle.

Figure 5:
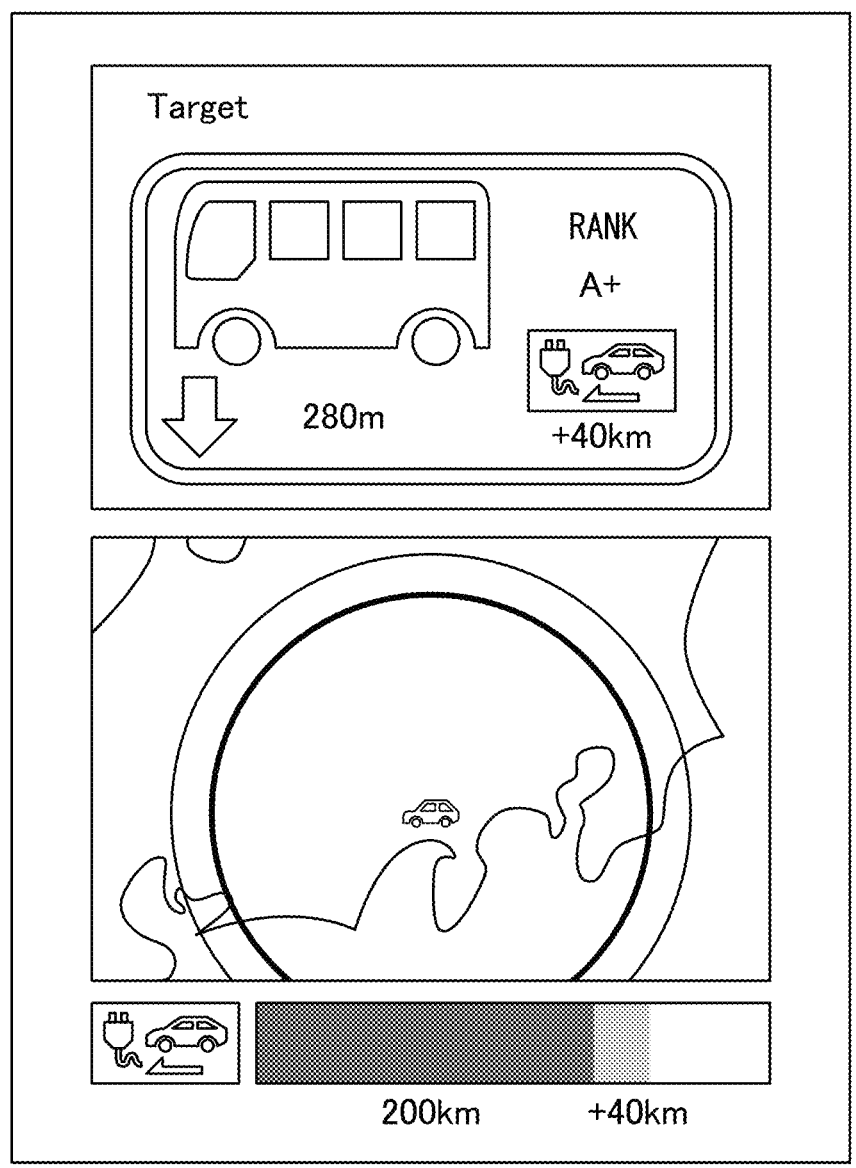
FIG. 5 is a diagram showing an example of image information displayed on the HMI.

FIG. 5 is a diagram showing an example of image information displayed on HMI 8. In the example of FIG. 5, the preceding vehicle candidate is displayed as a vehicle icon, and the image information includes extension information of the cruising range, location information of the preceding vehicle candidate, and information indicating the suitability as a tracking target of the preceding vehicle candidate.

In the example of FIG. 5, as the extension information of the cruising range, the extended cruising range estimated by the distance estimation unit 16 (+40 km in this example) is presented to the occupant of the vehicle as a numerical value, a map display, and a bar display. In the map display, a small circle indicating the range that the own vehicle can reach by the cruising range at the time of independent travel and a large circle indicating the range that the own vehicle can reach by the cruising range at the time of follow-up travel are drawn around the vehicle icon of the own vehicle, and the distance between the small circle and the large circle corresponds to the extended cruising range. Note that the range that the vehicle can reach is estimated in more detail based on topographic data such as a gradient, the estimated range may be indicated by polygons or the like. In the bar display, the extended cruising range is shown as an extension of the cruising range when traveling alone (200 km in this example). Note that the cruising range during independent travel is calculated by multiplying the residual power amount of the own vehicle by the estimated electric mileage or by multiplying the residual fuel amount of the own vehicle by the estimated fuel mileage.

Further, in the example of FIG. 5, the direction of the preceding vehicle candidate relative to the own vehicle (backward in this example) and the vehicle-to-vehicle distance between the own vehicle and the preceding vehicle candidate (280 m in this example) are shown as the positional information of the preceding vehicle candidate. Note that the vehicle icons of the own vehicle and the preceding vehicle candidate may be displayed, and the relative positional relationship of the preceding vehicle candidate with respect to the own vehicle may be indicated as the positional information relating to the preceding vehicle candidate.

Further, in the example of FIG. 5, as information indicating the suitability of the preceding vehicle candidate as the tracking target, a rank indicating the degree of the suitability is shown. For example, A+ to C− are used as the rank. In this case, when the rank is A+, the suitability is highest, and when the rank is C−, the suitability is lowest.

Note that the information output unit 17 may output audio information including extension information of the cruising range from HMI 8 in addition to or instead of the image information in order to provide audible information to the passenger of the vehicle. In addition, the information indicating the suitability of the preceding vehicle candidate as the tracking target may be omitted from the information outputted via HMI 8. After step S110, the control routine ends.

Note that in step S102, the preceding vehicle candidate selection unit 15, based on the output of the peripheral information detecting device 2, may acquire information about the surrounding vehicles around the own vehicle. For example, the preceding vehicle candidate selection unit 15 estimates the speed of the surrounding vehicle, the vehicle width and the vehicle height of the surrounding vehicle, and the like based on the output of the peripheral information detecting device 2. In this case, in step S105, the preceding vehicle candidate selection unit 15 estimates the estimated value of the forward projected area of the surrounding vehicle by multiplying the vehicle width of the surrounding vehicle by the vehicle height of the surrounding vehicle in order to calculate the degree of reduction in air resistance.

Further, in the surrounding vehicle, the parameter of the vehicle relating to the follow-up travel is registered in advance in the application for the follow-up travel, and in step S102, the preceding vehicle candidate selection unit 15 may acquire information about the surrounding vehicle around the own vehicle via the application for the follow-up travel. In this case, for example, a portable terminal in which an application for follow-up travel is installed is connected to an ECU of each vehicle, and information registered in the application for follow-up travel is transmitted and received between the vehicles via wide area communication via a carrier network.

For example, the parameters to be registered in the application for follow-up travel include the speed of the vehicle, vehicle width, vehicle height, forward projected area, air resistance coefficient (Cd value), destination, remaining fuel amount, charging rate of the battery (SOC: State Of Charge), etc. In this case, in step S105, the preceding vehicle candidate selection unit 15 calculates the degree of reduction of the air resistance based on the forward projection area, which is calculated by multiplying the vehicle width of the surrounding vehicle by the vehicle height of the surrounding vehicle, the forward projected area transmitted from the surrounding vehicle, or the air resistance coefficient (Cd value). Further, in step S109, the continuable distance of the follow-up travel to the preceding vehicle candidate is calculated based on the destination of the preceding vehicle candidate and the residual fuel amount or the SOC of the battery. For example, the distance of the overlapping traveling section of the own vehicle and the preceding vehicle candidate on the automobile exclusive road is calculated as the continuable distance of the follow-up travel to the preceding vehicle candidate, and the continuable distance is corrected based on the remaining fuel amount or the SOC of the battery of the preceding vehicle candidate. In this case, the less remaining fuel amount or the SOC of the battery of the preceding vehicle candidate, the shorter the continuable distance.

Second Embodiment

The configuration and control of the vehicle control system according to the second embodiment are basically the same as the configuration and control of the vehicle control system according to the first embodiment, except for the points described below. Therefore, the second embodiment of the present disclosure will be described below focusing on portions different from the first embodiment.

Figure 6:
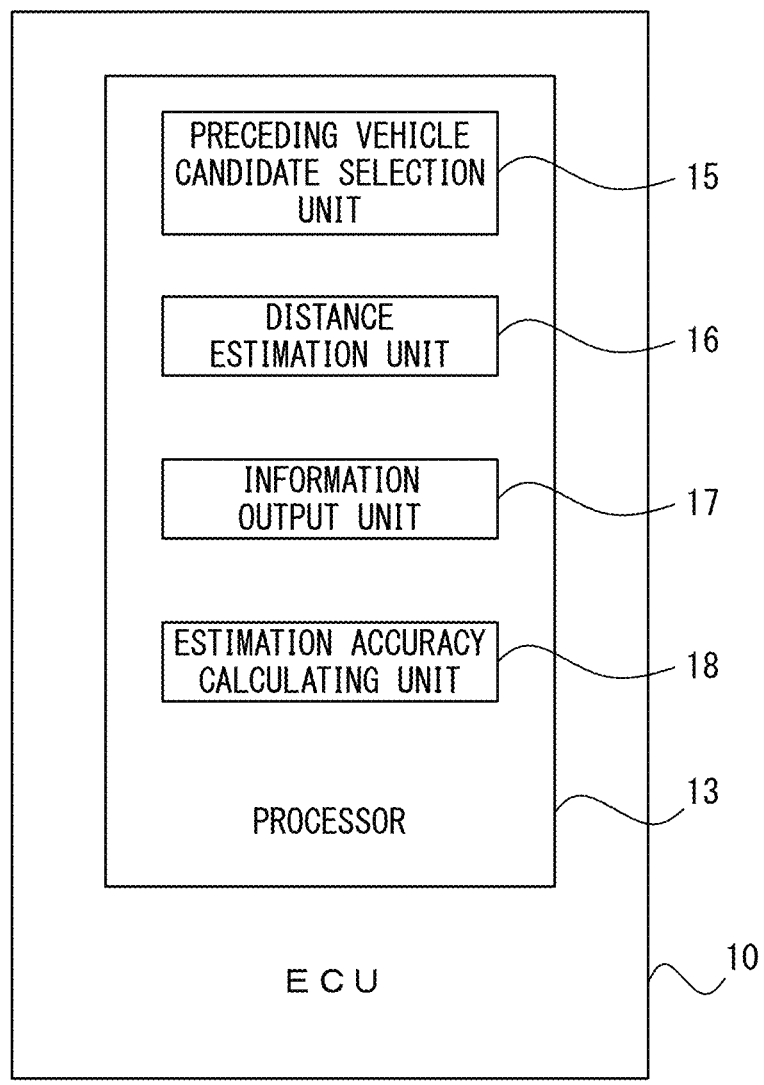
FIG. 6 is a functional block diagram of a processor of the ECU according to the second embodiment.

FIG. 6 is a functional diagram of the processor 13 of ECU 10 according to the second embodiment. In the second embodiment, the processor 13 includes an estimation accuracy calculating unit 18 in addition to the preceding vehicle candidate selection unit 15, the distance estimation unit 16, and the information output unit 17. The preceding vehicle candidate selection unit 15, the distance estimation unit 16, the information output unit 17, and the estimation accuracy calculating unit 18 are functional modules realized by the processor 13 of ECU 10 executing computer programs stored in the memory 12 of ECU 10. Each of these functional modules may be realized by a dedicated arithmetic circuit provided in the processor 13.

Normally, when the cruising range of the own vehicle is notified through HMI 8, the occupant (e.g., the driver) of the own vehicle determines the timing of charging the battery or the timing of replenishing fuel, considering not only the remaining power amount or the remaining fuel amount but also the cruising range. Therefore, if the value of the extended cruising range presented to the occupant of the vehicle as the extension information of cruising range deviates from the actual value, it may be necessary to change the charging timing of the battery or the refueling timing of the fuel.

Therefore, in the second embodiment, the estimation accuracy calculating unit 18 calculates the estimation accuracy of the extended cruising range estimated by the distance estimation unit 16, and the information output unit 17 changes the output mode of the extension information of the cruising range based on the estimation accuracy of the extended cruising range. By this, it is possible to reduce the effect of the error of the extended cruising range on the driving plan of the own vehicle.

For example, when the estimation accuracy of the extended cruising range is equal to or greater than a threshold value, the information output unit 17 outputs the extended cruising range as the extension information of the cruising range, and when the estimation accuracy of the extended cruising range is less than the threshold value, it does not output the extension information of the cruising range. By this, it is possible to suppress the extended cruising range with low reliability from being presented to the occupant of the vehicle.

Figure 7A:
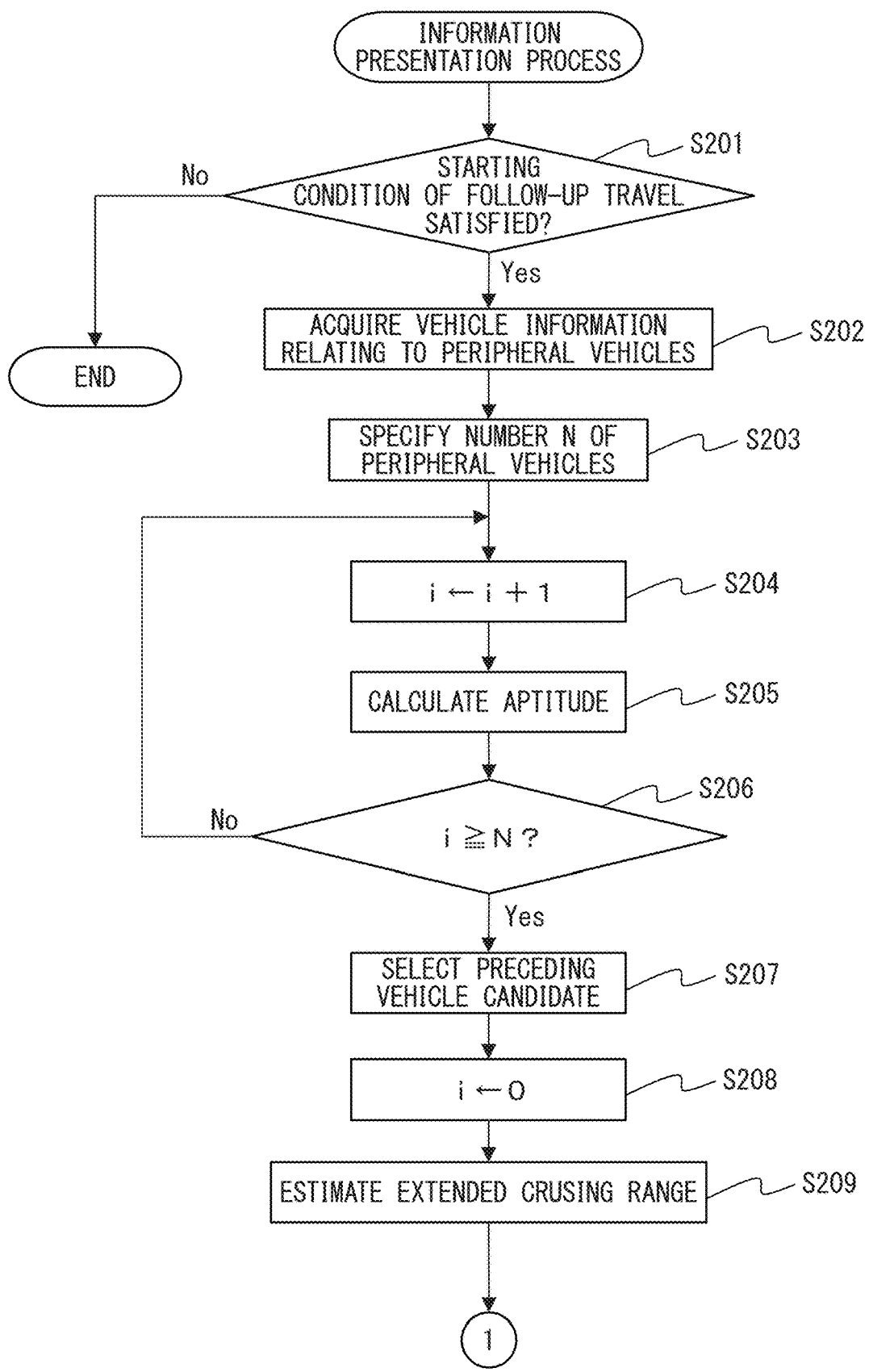
FIG. 7A is a flow chart showing control routines of the information presentation process in the second embodiment.
Figure 7B:
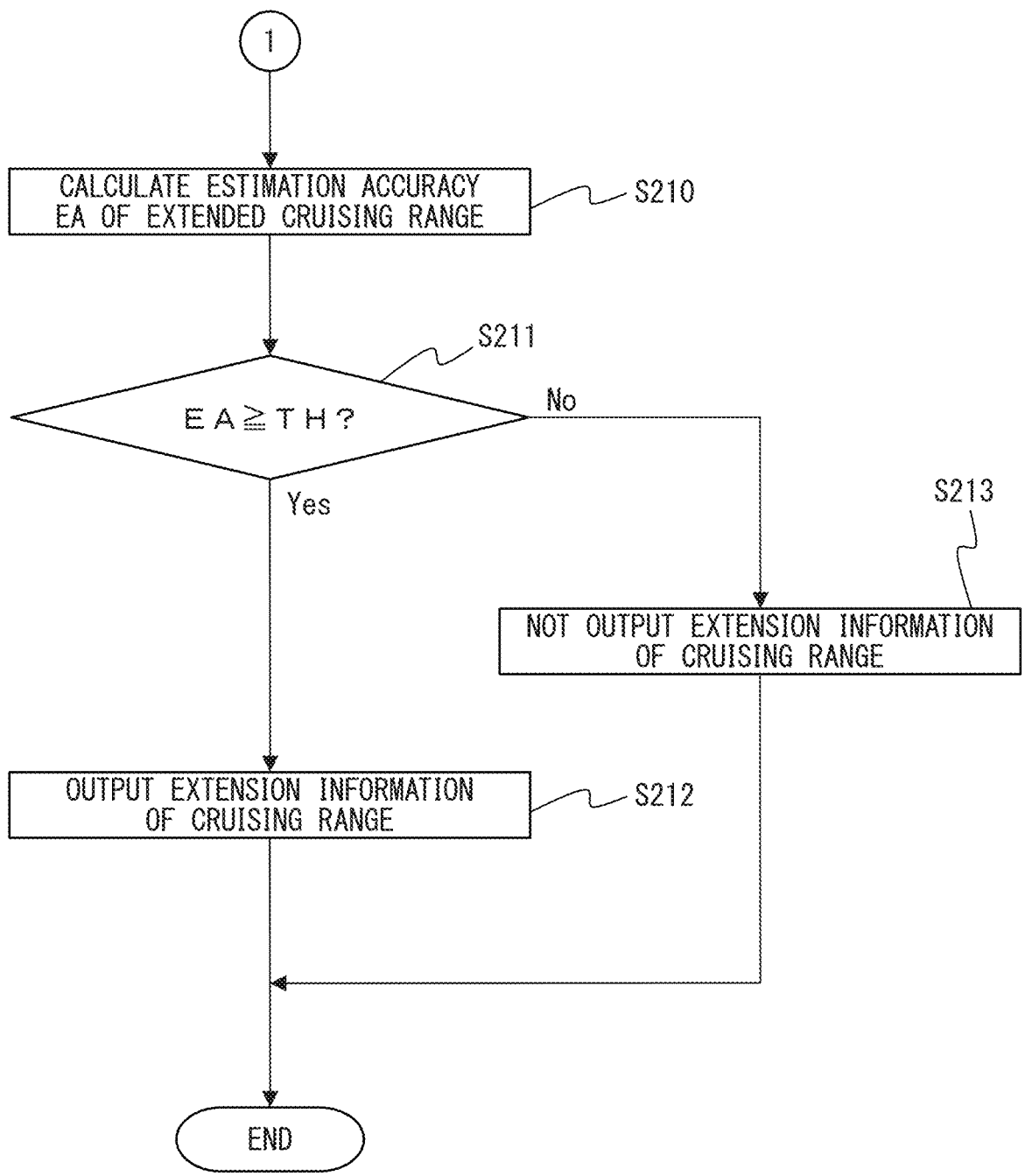
FIG. 7B is a flow chart showing control routines of the information presentation process in the second embodiment.

FIG. 7A and FIG. 7B are flowcharts showing the control routine of the information presentation process in the second embodiment. The control routine is repeatedly executed at predetermined intervals by the processor 13 of the ECU 10.

The steps S201~S209 are executed in the same manner as the steps S101~S109 of FIG. 4. After step S209, in step S210, the estimation accuracy calculating unit 18 calculates the estimation accuracy EA of the extended cruising range estimated by the distance estimation unit 16 in step S209.

For example, the estimation accuracy calculating unit 18 calculates the estimation accuracy EA of the extended cruising range based on the reliability of information (hereinafter, also referred to as "preceding vehicle information") relating to the preceding vehicle candidate. In this case, the higher the reliability of the preceding vehicle information, the higher the estimation accuracy EA of the extended cruising range.

For example, the estimated accuracy calculating unit 18 determines the reliability of the preceding vehicle information based on the acquisition means of the preceding vehicle information used for calculating the extended cruising range. Specific examples of the acquiring means of the preceding vehicle information include an application for the follow-up travel (wide area communication through the carrier network), vehicle-to-vehicle communication, and peripheral information detecting device 2. When the application for follow-up travel is activated in the preceding vehicle candidate, the preceding vehicle information is acquired via the application for follow-up travel, and when the preceding vehicle candidate has the inter-vehicle communication device and the application for follow-up travel is not activated in the preceding vehicle candidate, the preceding vehicle information is acquired via the inter-vehicle communication. On the other hand, when the preceding vehicle candidates do not have the communication means with the own vehicle, the preceding vehicle information is acquired through the peripheral information detecting device 2.

Parameters necessary for calculating the extended cruising range are registered in advance in the application for follow-up travel, and in information communication by inter-vehicle communication, only parameters included in a predetermined data set for inter-vehicle communication are transmitted from the preceding vehicle candidate to the own vehicle. When the peripheral information detecting device 2 is used as a means for acquiring the preceding vehicle information, the parameters required for calculating the extended cruising range are estimated based on the output of the peripheral information detecting device 2. Therefore, among these acquiring units, the reliability of the preceding vehicle information corresponding to the application for follow-up travel is the highest, and the reliability of the preceding vehicle information corresponding to the peripheral information detecting device 2 is the lowest.

In the present embodiment, the reliability of the preceding vehicle information is classified into three levels, for example, level 0, level 1, and level 2. In this case, the reliability of the preceding vehicle information is set to level 0 when the peripheral information detecting device 2 is used, set to level 1 when the vehicle-to-vehicle communication is used, and set to level 2 when the application for follow-up travel is used.

Note that if the preceding vehicle information acquisition means is of two types, for example, when an application for follow-up travel is not used as the preceding vehicle information acquisition means, the reliability of the preceding vehicle information may be set in two stages. Further, the reliability of the preceding vehicle information may be classified more finely. For example, when the number of parameters registered in the application for follow-up travel differs among the surrounding vehicles, the reliability of the preceding vehicle information in the case where the preceding vehicle information is acquired via the application for follow-up travel may be increased as the number of parameters registered in the application for follow-up travel increases. Further, when the number of parameters transmitted by the vehicle-to-vehicle communication differs among the surrounding vehicles, the reliability of the preceding vehicle information when the preceding vehicle information is acquired through the vehicle-to-vehicle communication may be increased as the number of parameters transmitted by the vehicle-to-vehicle communication increases. In addition, when the number of parameters that can be estimated based on the output of the peripheral information detecting device 2 differs among the surrounding vehicles according to the position of the surrounding vehicles or the like, the reliability of the preceding vehicle information when the preceding vehicle information is acquired through the peripheral information detecting device 2 may be increased as the number of parameters that can be estimated increases.

The extended cruising range obtained by the follow-up travel also varies with the position of the own vehicle relative to the preceding vehicle. For example, as the distance between the own vehicle and the preceding vehicle increases or the lateral position of the vehicle relative to the preceding vehicle shifts, the effect of reducing air resistance decreases and the extended cruising range decreases. Therefore, when the position of the vehicle relative to the preceding vehicle is likely to fluctuate during the follow-up travel, the estimation accuracy of the extended cruising range is reduced. In addition, basically, when the behavior of the own vehicle is automatically controlled by the driving support function, the stability of the follow-up travel is higher than when the behavior of the own vehicle is manually controlled by manual driving.

For this reason, the estimation accuracy calculating unit 18 may calculate the estimation accuracy EA of the extended cruising range based on the driving support level of the own vehicle. In this case, the higher the driving support level of the own vehicle, the higher the estimation accuracy EA of the extended cruising range. Please note that the driving support level of the own vehicle is an index indicating the operation status of the driving support function in the own vehicle, and differs from the automatic driving level defined by SAE (Society of Automotive Engineers).

For example, the driving support level is classified into three stages (e.g., Level 0, Level 1 and Level 2) according to the operating status of the driving support function. In this case, when the driving support function is not activated in the own vehicle, the driving support level is set to level 0. On the other hand, when ACC is operated in the own vehicle, that is, when acceleration and deceleration (braking) are automatically controlled in the own vehicle, the driving support level is set to level 1, and when LKA or LTA is operated in the own vehicle in addition to ACC, that is, when acceleration, deceleration (braking) and steering are automatically controlled in the own vehicle, the driving support level is set to 2. When one of ACC and LKA or LTA is activated, the driving support level may be set to level 1.

In addition, follow-up travel may be interrupted due to changes in the running environment such as traffic congestion, construction work, accident, bad weather (rain, snow, strong wind, heavy fog, etc.). When the distance of the follow-up travel becomes shorter than the assumed distance due to the interruption of the follow-up travel, the estimated extended cruising range becomes shorter than the actual value. Therefore, the estimation accuracy calculating unit 18 may calculate the estimation accuracy EA of the extended cruising range based on the reliability of the traveling environment information on the traveling route of the own vehicle. In this case, the higher the reliability of the running environment information, the higher the estimation accuracy EA of the extended cruising range.

For example, the estimation accuracy calculating unit 18 determines the reliability of the running environment information based on the acquiring means of the running environment information. Examples of the vehicle-to-vehicle communication and the navigation device 5 are exemplified as a means for acquiring the running environment information. For example, when the surrounding vehicle capable of inter-vehicle communication with the vehicle is located on the driving route of the vehicle, the speed of the surrounding vehicle is acquired through the inter-vehicle communication, the traveling environment information such as traffic jams is estimated based on the speed of the surrounding vehicle. In addition, in the own vehicle, road traffic information such as VIC S (registered trademark) (Vehicle Information and Communication System) information is transmitted to the navigation device 5 of the own vehicle through FM multiplex broadcasting, radio wave beacons, optical beacons, and the like. In vehicle-to-vehicle communication, almost real-time information is transmitted to the vehicle, and thus the reliability of the running environment information is higher than that of the navigation device 5.

In the present embodiment, the reliability of the running environment information is classified into three levels, for example, level 0, level 1, and level 2. In this case, the reliability of the running environment information is set to level 2 when the running environment information is acquired via the inter-vehicle communication, is set to level 1 when the running environment information is acquired via the navigation device 5, and is set to level 0 when the running environment information cannot be acquired due to the communication condition or the like. The reliability of the running environment information may be set to Level 2 when the running environment information is acquired via wide area communication between a server outside the own vehicle and the own vehicle using a wide area communication device (e.g., a data communication module (DCM: Data Communication Module)), that is, when the running environment information acquiring unit is wide area communication.

Further, the reliability of the running environment information may be classified more finely.

For example, when the running environment information is acquired through the vehicle-to-vehicle communication, the more the number of surrounding vehicles capable of vehicle-to-vehicle communication located on the traveling route, the reliability of the running environment information may be increased. Further, when the running environment information is acquired through the navigation device 5, the closer the time when the running environment information is acquired, the higher the reliability of the running environment information may be.

Further, the estimation accuracy calculating unit 18 may calculate the estimation accuracy EA of the extended cruising range based on any combination of the reliability of the preceding vehicle information, the driving support level of the own vehicle, and the reliability of the running environment information using the map or the calculation formula. That is, the estimation accuracy calculating unit 18 calculates the estimation accuracy EA of the extended cruising range based on at least one of the reliability of the preceding vehicle information, the driving support level of the own vehicle, and the reliability of the running environment information.

Further, as described above, the distance estimation unit 16 estimates the extended cruising range based on the degree of reduction of the air resistance due to the follow-up travel to the preceding vehicle candidate and the continuable distance of the follow-up travel to the preceding vehicle candidate. For this reason, the estimation accuracy calculating unit 18 may calculate the estimation accuracy EA of the extended cruising range based on the first confidence degree of the degree of reduction of the air resistance due to the follow-up travel to the preceding vehicle candidate and the second confidence degree of the continuable distance of the follow-up travel to the preceding vehicle candidate. In this case, the higher the first confidence, the higher the estimation accuracy EA, and the higher the second confidence, the higher the estimation accuracy EA.

The first confidence degree and the second confidence degree are determined by using, for example, tables as shown in FIGS. 8 and 9, respectively. FIG. 8 is a diagram illustrating an example of a table for determining the first confidence degree of the degree of reduction of the air resistance due to the follow-up travel to the preceding vehicle candidate. In the example of FIG. 8, the value of the reliability of the preceding vehicle information is described on the horizontal axis, and the value of the driving support level of the own vehicle is described on the vertical axis. That is, the estimation accuracy calculating unit 18 determines the first confidence level based on the reliability level of the preceding vehicle information and the driving support level of the own vehicle.

As described above, the reliability of the preceding vehicle information is determined based on, for example, the acquisition means of the preceding vehicle information. When an application for follow-up travel is used, for example, the speed of the preceding vehicle candidate, and the vehicle width and the vehicle height of the preceding vehicle candidate, the forward projected area, or the air resistance coefficient (Cd value) are obtained as the preceding vehicle information for calculating the degree of reduction of the air resistance. When the vehicle-to-vehicle communication is used, for example, the speed, the vehicle width, and the vehicle length of the preceding vehicle candidate are acquired as the preceding vehicle information for calculating the degree of reduction of the air resistance. When the peripheral information detecting device 2 is used, for example, the speed, the vehicle width, and the vehicle height of the preceding vehicle candidate estimated based on the output of the peripheral information detecting device 2 are acquired as the preceding vehicle information for calculating the degree of reduction of the air resistance. Further, the driving support level of the own vehicle, as described above, for example, is determined according to the operation status of the driving support function in the own vehicle.

In the example of FIG. 8, the first confidence level is defined as the rank, and A to E are used as the rank. In this case, the first confidence level is the highest when the rank is A, and the first confidence level is the lowest when the rank is E. As shown in FIG. 8, the first confidence level is higher as the reliability of the preceding vehicle information is higher, and the higher the driving support level of the own vehicle is. Note that, the estimation accuracy calculating unit 18 may determine the first confidence based on either one of the reliability of the preceding vehicle information and the driving support level of the own vehicle.

FIG. 9 is a diagram illustrating an example of a table for determining a second confidence degree of a continuable distance of follow-up travel to a preceding vehicle candidate. In the example of FIG. 9, the value of the reliability of the preceding vehicle information is described on the horizontal axis, and the value of the reliability of the running environment information is described on the vertical axis. That is, the estimation accuracy calculating unit 18 determines the second confidence degree based on the reliability level of the preceding vehicle information and the reliability level of the running environment information.

As described above, the reliability of the preceding vehicle information is determined based on, for example, the acquisition means of the preceding vehicle information. When an application for follow-up travel is used, for example, the SOC or remaining fuel amount of the preceding vehicle candidate and the destination of the preceding vehicle candidate are acquired as the preceding vehicle information for calculating the continuable distance of follow-up travel. When the vehicle-to-vehicle communication is used, for example, usage type information of the preceding vehicle candidate is acquired as the preceding vehicle information for calculating the continuable distance of the follow-up travel. When the peripheral information detecting device 2 is used, for example, the continuable distance of the follow-up travel is set to the continuable distance of the own vehicle in the automobile exclusive road. Further, as described above, the reliability of the running environment information is determined based on, for example, the means for acquiring the running environment information.

In the example of FIG. 9, the second confidence level is defined as the rank, and A to E are used as the rank. In this case, the second confidence degree is the highest when the rank is A, and the second confidence degree is the lowest when the rank is E. As shown in FIG. 9, the higher the reliability of the preceding vehicle information, the higher the second confidence degree is, and the higher the reliability of the running environment information, the higher the second confidence degree is. Note that, the estimation accuracy calculating unit 18 may determine the second confidence degree based on any one of the reliability of the preceding vehicle information and the reliability of the running environment information.

Next, in step S211, the information output unit 17 determines whether or not the estimated accuracy EA of the extended cruising range is equal to or greater than a predetermined threshold TH. The threshold TH is predetermined, for example, when the estimation accuracy EA is calculated based on any one of the reliability of the preceding vehicle information, the driving support level of the own vehicle, and the reliability of the running environment information, is set to level 1 or level 2. When the estimated accuracy EA of the extended cruising range is calculated based on the first confidence degree and the second confidence degree, for example, the threshold TH is set so that the estimated accuracy EA is equal to or greater than the threshold TH when both or at least one of the first confidence degree and the second confidence degree is equal to or greater than a predetermined value (e.g., B−, C+, or C).

If it is determined in step S211 that the estimated accuracy EA is equal to or greater than the threshold TH, the control routine proceeds to step S212. In the step S212, similarly to the step S110 of FIG. 4, the information output unit 17 outputs the extended cruising range as the extension information of the cruising range through HMI 8. After step S212, the control routine ends.

On the other hand, if it is determined in step S211 that the estimated accuracy EA is less than the threshold TH, the control routine proceeds to step S213. In step S213, the information output unit 17 does not output the extension information of the cruising range. In this case, the information output unit 17 outputs, via HMI 8, information other than the extension information of the cruising range, for example, the position information of the preceding vehicle candidate and the information indicating the suitability of the preceding vehicle candidate as the tracking target, or the position information of the preceding vehicle candidate. After step S213, the control routine ends.

Note that the information output unit 17 may output the extended cruising range as extension information of cruising range when the estimation accuracy of the extended cruising range is equal to or greater than the threshold, and may output a distance shorter than the extended cruising range as extension information of cruising range when the estimation accuracy of the extended range is less than the threshold. In this way, it is possible to urge the occupant of the vehicle to perform the follow-up travel while reducing the effect of the error due to the extended cruising range. In this case, a distance shorter than the extended cruising range output as the extension information of the cruising range is calculated by multiplying the extended cruising range by a predetermined coefficient less than 1, and the predetermined coefficient is set to, for example, ¼ to ¾, preferably ½. When the predetermined coefficient is ½, in the example of FIG. 5, +20 km is displayed as the extension information when the estimation accuracy of the extended cruising range is less than the threshold value.

Third Embodiment

The configuration and control of the vehicle control system according to the third embodiment are basically the same as the configuration and control of the vehicle control system according to the second embodiment, except for the points described below. Therefore, the third embodiment of the present disclosure will be described below focusing on portions different from the second embodiment.

In the third embodiment, the information output unit 17 outputs the extended cruising range as extension information when the estimation accuracy of the extended range is equal to or greater than the first threshold, outputs the distance shorter than the extended cruising range as extension information when the estimation accuracy of the extended cruising range is less than the first threshold and equal to or greater than a second threshold that is lower than the first threshold, and does not output the extension information when the estimation accuracy of the extended range is less than the second threshold. In this way, it is possible to urge the occupant of the vehicle to perform the follow-up travel while reducing the effect of the error due to the extended cruising range.

Figure 10A:
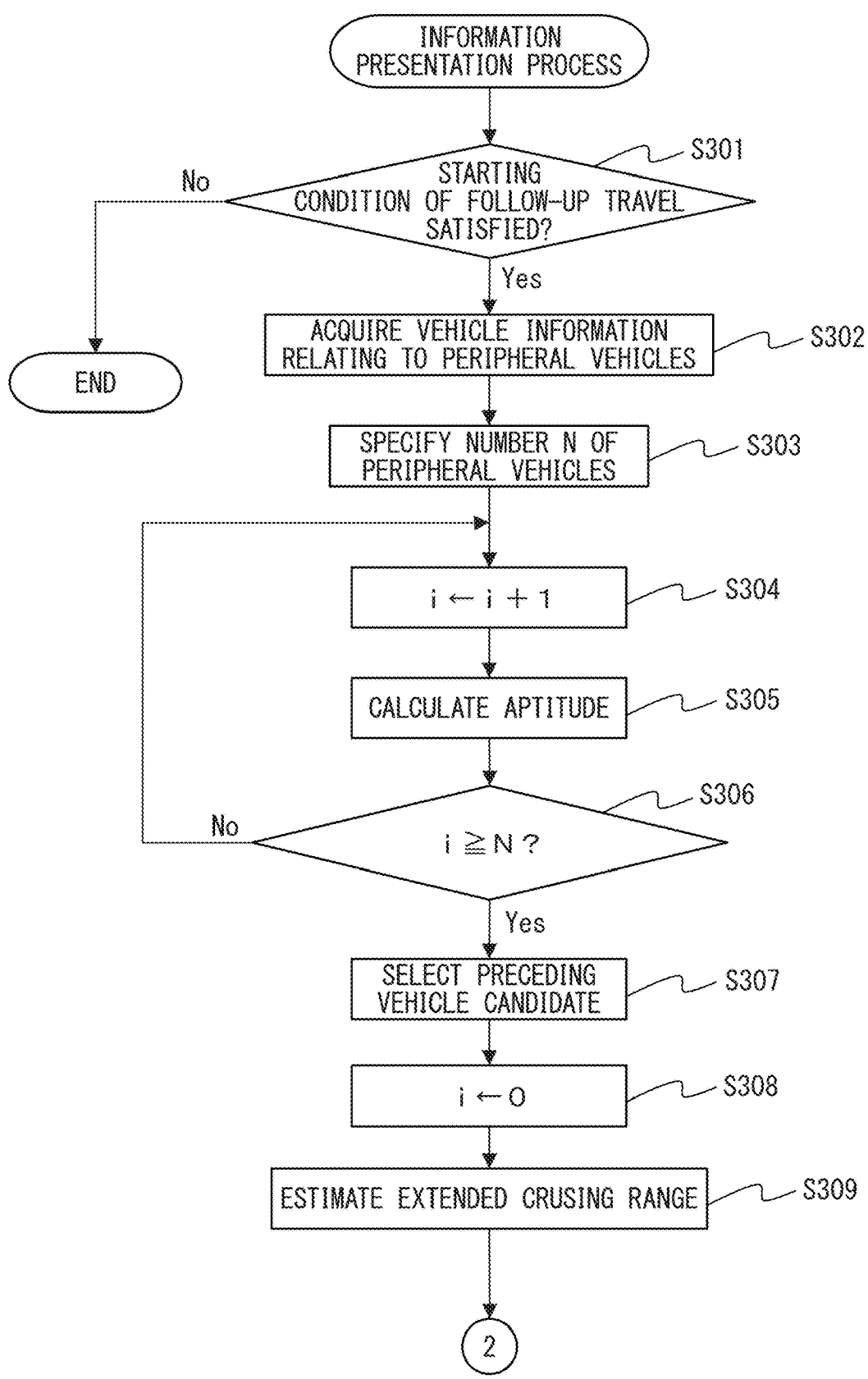
FIG. 10A is a flow chart showing control routines of the information presentation process in the third embodiment.
Figure 10B:
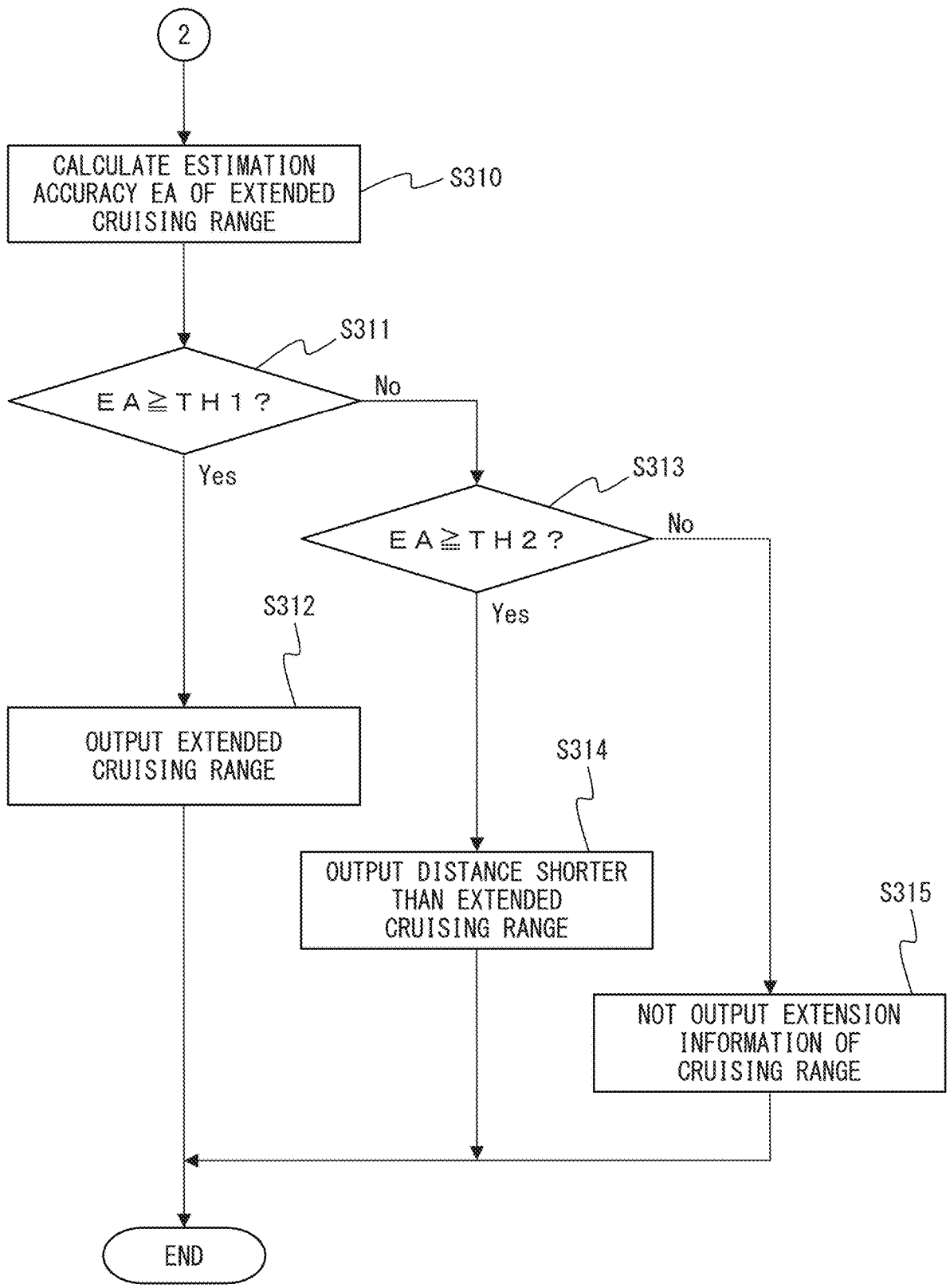
FIG. 10B is a flow chart showing control routines of the information presentation process in the third embodiment.

FIG. 10A and FIG. 10B are flowcharts showing the control routine of the information presentation process in the third embodiment. The control routine is repeatedly executed at predetermined intervals by the processor 13 of the ECU 10.

Steps S301 to S310 are performed in the same manner as steps S201 to S210 in FIGS. 7A and 7B. After step S310, in step S311, the information output unit 17 determines whether or not the estimation accuracy EA of the extended cruising range is equal to or greater than the predetermined first threshold TH1. The first threshold TH1 is predetermined, for example, when the estimation accuracy EA is calculated based on any one of the reliability of the preceding vehicle information, the driving support level of the own vehicle, and the reliability of the running environment information, is set to the level 2. When the estimated accuracy EA of the extended cruising range is calculated based on the first confidence degree and the second confidence degree, for example, the first threshold TH1 is set so that the estimated accuracy EA is equal to or greater than the first threshold TH1 when both the first confidence degree and the second confidence degree are equal to or greater than a predetermined value (e.g., B−, C+, or C).

If it is determined in step S311 that the estimated accuracy EA is equal to or greater than the first threshold TH1, the control routine proceeds to step S312. In step S312, similarly to step S110 of FIG. 4, the information output unit 17 outputs the extended cruising range as the extension information of the cruising range through HMI 8. After step S312, the control routine ends.

On the other hand, if it is determined in step S311 that the estimated accuracy EA is less than the first threshold TH1, the control routine proceeds to step S313. In step S313, the information output unit 17 determines whether or not the estimated accuracy EA of the extended cruising range is equal to or greater than a predetermined second threshold TH2. The second threshold TH2 is predetermined, for example, when the estimation accuracy EA is calculated based on any one of the reliability of the preceding vehicle information, the driving support level of the own vehicle, and the reliability of the running environment information, is set to the level 1. When the estimated accuracy EA of the extended cruising range is calculated based on the first confidence degree and the second confidence degree, for example, the second threshold TH2 is set so that the estimated accuracy EA is equal to or greater than the second threshold TH2 when at least one of the first confidence degree and the second confidence degree is equal to or greater than a predetermined value (e.g., B−, C+, or C).

If it is determined in step S313 that the estimated accuracy EA is equal to or greater than the second threshold value TH2, the control routine proceeds to step S314. In step S314, the information output unit 17 outputs a distance shorter than the extended cruising range as the extension information of the cruising range through HMI 8. A distance shorter than the extended cruising range is calculated by multiplying the extended cruising range by a predetermined coefficient less than 1, and the predetermined coefficient is set to, for example, ¼ to ¾, preferably ½. After step S314, the control routine ends.

On the other hand, if it is determined in step S313 that the estimated accuracy EA is less than the second threshold value TH2, the control routine proceeds to step S315. In step S315, the information output unit 17 does not output the extension information of the cruising range. In this instance, the information output unit 17 outputs, via HMI 8, information other than the extension information of the cruising range, for example, the position information of the preceding vehicle candidate and the information indicating the suitability of the preceding vehicle candidate as the tracking target, or the position information of the preceding vehicle candidate. After step S315, the control routine ends.

Fourth Embodiment

The configuration and control of the vehicle control system according to the fourth embodiment are basically the same as the configuration and control of the vehicle control system according to the first embodiment, except for the following points. Therefore, the fourth embodiment of the present disclosure will be described below focusing on portions different from the first embodiment.

Figure 11:
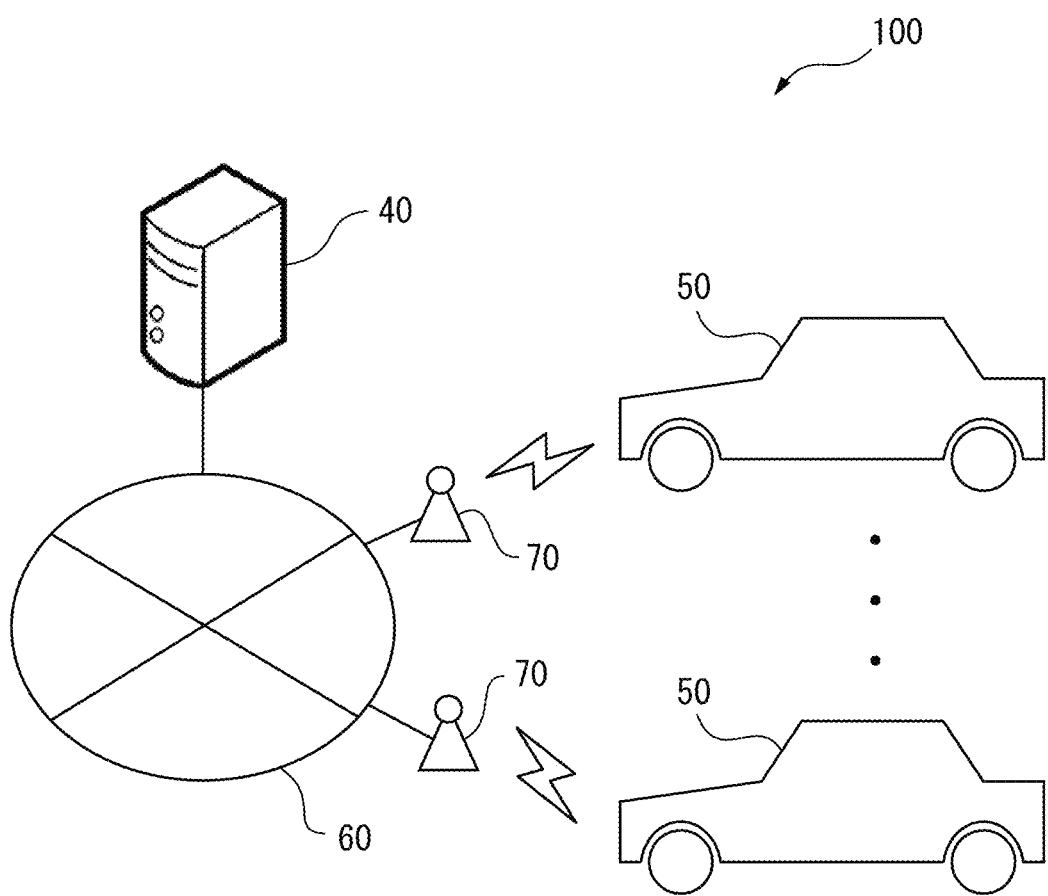
FIG. 11 is a schematic configuration diagram of a client-server system including an information presentation device according to a third embodiment of the present disclosure.

FIG. 11 is a schematic configuration diagram of a client-server system 100 including an information presentation device according to a fourth embodiment of the present disclosure. The client-server system 100 includes a server 40 and a plurality of vehicles 50. The server 40 can communicate with each of the plurality of vehicles 50 via a communication network 60, such as a carrier network or Internet network, and a radio base station 70. That is, the server 40 can communicate with each of the plurality of vehicles 50 via wide area communication.

Figure 12:
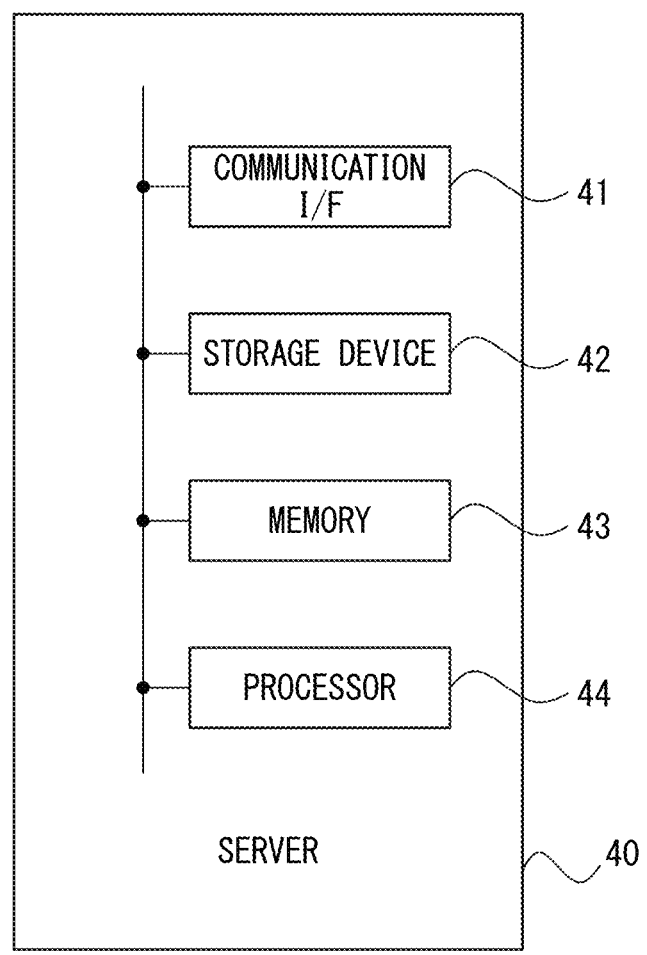
FIG. 12 is a diagram schematically showing a configuration of a server.

FIG. 12 is a diagram schematically showing the configuration of the server 40. The server 40 includes a communication interface 41, a storage device 42, a memory 43, and a processor 44.

The communication interface 41, storage device 42 and memory 43 are connected to the processor 44 via signal lines. The server 40 may further include an input device such as a keyboard and a mouse, an output device such as a display, and the like. The server 40 may comprise of a plurality of computers.

The communication interface 41 has an interface circuit for connecting the server 40 to the communication network 60. The server 40 communicates with the outside of the server 40, for example, a plurality of vehicles 50, via the communication network 60. The communication interface 41 is an example of a communication unit of the server 40.

The storage device 42 includes, for example, a hard disk drive (HDD), a solid-state drive (SDD), or an optical recording medium and its accessing device. The storage device 42 stores various kinds of data, for example, map information, information of a plurality of vehicle 50 (identification information, position information, and the like), and a computer program for the processor 44 to execute various kinds of processing. Storage device 42 is one example of a storage portion of server 40.

The memory 43 includes a nonvolatile semiconductor memory such as RAM. The memory 43 temporarily stores, for example, various data used when various processing is executed by the processor 44. Memory 43 is another example of a storage portion of server 40.

The processor 44 includes one or a plurality of CPUs and peripheral circuits thereof, and executes various processes. The processor 44 may further include other arithmetic circuits such as a logical arithmetic unit, a numerical arithmetic unit, or a graphic processing unit.

In the fourth embodiment, the server 40 functions as the information presentation device instead of ECU 10, and the processor 44 of the server 40 includes the preceding vehicle candidate selection unit 15, the distance estimation unit 16, and the information output unit 17. The preceding vehicle candidate selection unit 15, the distance estimation unit 16, and the information output unit 17 are functional modules realized by the processor 44 of the server 40 executing computer programs stored in the storage device 42 of the server 40.

Therefore, in the fourth embodiment, the control routine of the information presentation process of FIG. 4 is executed by the processor 44 of the server 40. In this case, in step S101, the preceding vehicle candidate selection unit 15 determines whether or not the starting condition of the follow-up travel is satisfied in any one of the plurality of vehicles 50. When this determination is affirmative, in the following processing steps, the vehicle 50 which satisfies the starting condition of the follow-up travel is recognized as the own vehicle.

In step S102, the preceding vehicle candidate selection unit 15 acquires information about the surrounding vehicles located in a predetermined range (for example, a range in which the vehicle-to-vehicle distance with the own vehicle is equal to or less than a predetermined value) around the own vehicle via the wide area communication. Next, in step S103, the preceding vehicle candidate selection unit 15 specifies the number N of the surrounding vehicles in which the information is acquired by the server 40, and assigns the vehicle numbers (1 to N) to each of the N surrounding vehicles.

Next, in step S104, the preceding vehicle candidate selection unit 15 updates the vehicle number i by adding 1 to the vehicle number i. The initial value of the vehicle number i is zero.

Steps S105 to S109 are then performed as described above with respect to the first embodiment.

After step S109, in step S110, the information output unit 17 transmits an instruction to ECU 10 of the own vehicle and outputs the extension information of the cruising range when the own vehicle follows the preceding vehicle candidates through HMI 8 of the own vehicle. For example, when the image information including the extension information of the cruising range is displayed on HMI 8, the image information is transmitted from the server 40 to the vehicle.

Note that in the plurality of vehicles 50, the parameters of the vehicle relating to the follow-up travel is registered in advance in the application for the follow-up travel, and in step S102, the preceding vehicle candidate selection unit 15, via the application for the follow-up travel, may acquire information about the surrounding vehicles around the own vehicle.

While preferred embodiments of the present disclosure have been described above, the present disclosure is not limited to these embodiments, and various modifications and changes may be made within the scope of the appended claims. For example, the vehicle in which the vehicle control system 1 is provided may be a manually operated vehicle having no driving support function. Further, the preceding vehicle candidate selection unit 15 may select a plurality of preceding vehicle candidates, and the information output unit 17 may output the extension information of the cruising range when the own vehicle follows the preceding vehicle candidate for each of the plurality of preceding vehicle candidates.

Further, a computer program that causes the computer to realize the functions of each unit of the processor 13 of ECU 10 or the processor 44 of the server 40 may be provided in a form stored on a computer readable recording medium. The computer readable recording medium is, for example, a magnetic recording medium, an optical recording medium, or a semiconductor memory.

In addition, the above-described embodiments can be optionally combined and implemented. When the second embodiment and the fourth embodiment are combined, the control routine of the information presentation processing of FIGS. 7A and 7B is executed by the processor 44 of the server 40, and when the third embodiment and the fourth embodiment are combined, the control routine of the information presentation processing of FIGS. 10A and 10B is executed by the processor 44 of the server 40. In these cases, for example, the reliability of the preceding vehicle information and the reliability of the running environment information are determined as follows.

The reliability of the preceding vehicle information is set to level 2 when the application for follow-up travel is used as the means for acquiring the preceding vehicle information, and is set to level 1 when the application for follow-up travel is not used as the means for acquiring the preceding vehicle information. The reliability of the running environment information is set to level 1 when wide area communication between the server 40 and the vehicle is used as the means for acquiring the running environment information, and is set to level 0 when the running environment information cannot be acquired due to the communication environment or the like.

DESCRIPTION OF SYMBOLS

8 Human Machine Interface (HMI)
10 Electronic control unit (ECU)
13 Processor
15 Preceding vehicle candidate selection unit
16 Distance estimation unit
17 Information output unit
20 Own vehicle
30 Surrounding vehicles
40 Server
44 Processor

The invention claimed is:

1. An information presentation device comprising a processor configured to:
select a preceding vehicle candidate that is a candidate to be followed by an own vehicle based on information about a surrounding vehicle around the own vehicle;
estimate an extended cruising range of the own vehicle obtained by a follow-up travel of the own vehicle traveling behind the preceding vehicle candidate; and
output, via an output device provided in the own vehicle, the extended cruising range as extension information of a cruising range of the own vehicle when the own vehicle follows the preceding vehicle candidate, wherein
the processor is further configured to
(i) calculate an estimated accuracy of the extended cruising range based on (a) a first confidence degree of a degree of reduction of an air resistance obtained by the follow-up travel of the own vehicle traveling behind the preceding vehicle candidate, the first confidence degree of the degree of reduction of the air resistance being determined from a manner in which information about the preceding vehicle candidate was obtained and a driving support level of the own vehicle, and (b) a second confidence degree of a continuable distance of the own vehicle performing the follow-up travel of following behind the preceding vehicle candidate, the second confidence degree of the continuable distance of the own vehicle performing the follow-up travel being determined from the manner in which the information about the preceding vehicle candidate was obtained and a reliability level of running environment information about a driving route of the own vehicle, and
ii) change an output mode of the extension information based on the estimated accuracy.

2. The information presentation device as claimed in claim 1, wherein the processor is configured to calculate the estimated accuracy based on a reliability of the information about the preceding vehicle candidate.

3. The information presentation device according to claim 1, wherein the processor is configured to (i) output the extended cruising range as the extension information when the estimated accuracy is equal to or greater than a threshold value, and (ii) not output the extension information when the estimated accuracy is less than the threshold value.

4. The information presentation device according to claim 1, wherein the processor is configured to (i) output the extended cruising range as the extension information when the estimated accuracy is equal to or greater than a threshold value, and (ii) output a distance shorter than the extended cruising range as the extension information when the estimated accuracy is less than the threshold value.

5. The information presentation device according to claim 1, wherein the processor is configured to (i) output the extended cruising range as the extension information when the estimated accuracy is equal to or greater than a first threshold, (ii) output a distance shorter than the extended cruising range as the extension information when the estimated accuracy is less than the first threshold and equal to or greater than a second threshold that is lower than the first threshold, and (iii) not output the extension information when the estimated accuracy is less than the second threshold.

6. An information presenting method executed by a hardware processor, the method comprising:
selecting a preceding vehicle candidate that is a candidate to be followed by an own vehicle based on information about a surrounding vehicle around the own vehicle;
estimating an extended cruising range of the own vehicle obtained by a follow-up travel of the own vehicle traveling behind the preceding vehicle candidate; and
outputting, via an output device provided in the own vehicle, the extended cruising range as extension information of a cruising range of the own vehicle when the own vehicle follows the preceding vehicle candidate, wherein
the hardware processor further:
(i) calculates an estimated accuracy of the extended cruising range based on (a) a first confidence degree of a degree of reduction of an air resistance obtained by the follow-up travel of the own vehicle traveling behind the preceding vehicle candidate, the first confidence degree of the degree of reduction of the air resistance being determined from a manner in which information about the preceding vehicle candidate was obtained and a driving support level of the own vehicle, and (b) a second confidence degree of a continuable distance of the own vehicle performing the follow-up travel of following behind the preceding vehicle candidate, the second confidence degree of the continuable distance of the own vehicle performing the follow-up travel being determined from the manner in which the information about the preceding vehicle candidate was obtained and a reliability level of running environment information about a driving route of the own vehicle, and
(ii) changes an output mode of the extension information based on the estimated accuracy.

7. A non-transitory recording medium having recorded thereon a computer program for presenting information, the computer program, when executed by a hardware processor of a computer, causing the hardware processor to:
select a preceding vehicle candidate that is a candidate to be followed by an own vehicle based on information about a surrounding vehicle around the own vehicle;
estimate an extended cruising range of the own vehicle obtained by a follow-up travel of the own vehicle traveling behind the preceding vehicle candidate; and
output, via an output device provided in the own vehicle, the extended cruising range as extension information of a cruising range of the own vehicle when the own vehicle follows the preceding vehicle candidate, wherein
the computer program further causes the hardware processor to:
(i) calculate an estimated accuracy of the extended cruising range based on (a) a first confidence degree of a degree of reduction of an air resistance obtained by the follow-up travel of the own vehicle traveling behind the preceding vehicle candidate, the first confidence degree of the degree of reduction of the air resistance being determined from a manner in which information about the preceding vehicle candidate was obtained and a driving support level of the own vehicle, and (b) a second confidence degree of a continuable distance of the own vehicle performing the follow-up travel of following behind the preceding vehicle candidate, the second confidence degree of the continuable distance of the own vehicle performing the follow-up travel being determined from the manner in which the information about the preceding vehicle candidate was obtained and a reliability level of running environment information about a driving route of the own vehicle, and (ii) change an output mode of the extension information based on the estimated accuracy.

8. The information presentation device according to claim 1, wherein the first confidence degree of the degree of reduction of the air resistance is higher when the manner in which the information about the preceding vehicle candidate was obtained was by inter-vehicle communication between the own vehicle and the preceding vehicle candidate compared to when the information about the preceding vehicle candidate was obtained by a peripheral information detecting device of the own vehicle;

the first confidence degree of the degree of reduction of the air resistance is higher when the driving support level of the own vehicle automatically controls at least one of acceleration/deceleration and steering of the own vehicle compared to when the acceleration/deceleration and the steering of the own vehicle are not automatically controlled;

the second confidence degree of the continuable distance of the own vehicle performing the follow-up travel is higher when the manner in which the information about the preceding vehicle candidate was obtained was by inter-vehicle communication between the own vehicle and the preceding vehicle candidate compared to when the information about the preceding vehicle candidate was obtained by the peripheral information detecting device of the own vehicle; and the second confidence degree of the continuable distance of the own vehicle performing the follow-up travel is higher when the running environment information is acquired by inter-vehicle communication between the own vehicle and the preceding vehicle candidate compared to when the running environment information cannot be acquired.

* * * * *